(12) United States Patent
Lee et al.

(10) Patent No.: US 9,501,098 B2
(45) Date of Patent: Nov. 22, 2016

(54) INTERFACE CONTROLLING APPARATUS AND METHOD USING FORCE

(75) Inventors: Bho Ram Lee, Seongnam-si (KR);
Joon Ah Park, Seoul (KR); Hyun Jeong Lee, Hwaseong-si (KR); Soo Chul Lim, Seoul (KR); Hyung Kew Lee, Gunpo-si (KR); Seung Ju Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 137 days.

(21) Appl. No.: 13/447,671

(22) Filed: Apr. 16, 2012

(65) Prior Publication Data

US 2013/0069861 A1 Mar. 21, 2013

(30) Foreign Application Priority Data

Sep. 19, 2011 (KR) .................. 10-2011-0094154

(51) Int. Cl.
| | | |
|---|---|---|
| *G06F 3/041* | (2006.01) | |
| *G06F 1/16* | (2006.01) | |
| *G06F 3/0482* | (2013.01) | |
| *G06F 3/0483* | (2013.01) | |
| *G06F 3/0484* | (2013.01) | |
| *G06F 3/0354* | (2013.01) | |

(52) U.S. Cl.
CPC ........... *G06F 1/1626* (2013.01); *G06F 1/1694* (2013.01); *G06F 3/03548* (2013.01); *G06F 3/0414* (2013.01); *G06F 3/0482* (2013.01); *G06F 3/0483* (2013.01); *G06F 3/04847* (2013.01); *G06F 2203/04806* (2013.01)

(58) Field of Classification Search
CPC ..................................................... G06F 3/0414
See application file for complete search history.

(56) References Cited

U.S. PATENT DOCUMENTS

| | | | | |
|---|---|---|---|---|
| 2007/0256547 A1* | 11/2007 | Feeney et al. | .................. | 84/615 |
| 2008/0259046 A1* | 10/2008 | Carsanaro | ............... | G06F 3/016 345/173 |
| 2009/0256807 A1* | 10/2009 | Nurmi | ................... | G06F 3/0338 345/173 |
| 2010/0052880 A1* | 3/2010 | Laitinen et al. | ........... | 340/407.2 |
| 2010/0128002 A1* | 5/2010 | Stacy et al. | ................... | 345/174 |
| 2010/0156941 A1* | 6/2010 | Seung | ........................... | 345/660 |
| 2010/0271312 A1* | 10/2010 | Alameh | ................ | G06F 3/0421 345/173 |

(Continued)

FOREIGN PATENT DOCUMENTS

| | | |
|---|---|---|
| JP | 2010-113445 | 5/2010 |
| JP | 2011-065512 | 3/2011 |

(Continued)

OTHER PUBLICATIONS

Jun Rekimoto et al., "PreSenseII: Bi-directional Touch and Pressure Sensing Interactions with Tactile Feedback", *CHI 2006*, Apr. 22-17, 2006, 6 pp.

Craig Stewart et al., "Characteristics of Pressure-Based Input for Mobile Devices", *CHI 2010: Tactile Interaction*, Apr. 10-15, 2010, pp. 801-810.

*Primary Examiner* — Viet Pham
*Assistant Examiner* — Christopher Kohlman
(74) *Attorney, Agent, or Firm* — NSIP Law

(57) ABSTRACT

An interface controlling apparatus and method using a force may generate content control information by analyzing force input information received from at least one force sensor, and may control content based on the content control information.

27 Claims, 38 Drawing Sheets

(56) References Cited

U.S. PATENT DOCUMENTS

| | | |
|---|---|---|
| 2010/0277432 A1 | 11/2010 | Tsai |
| 2010/0321319 A1 | 12/2010 | Hefti |
| 2011/0012921 A1 | 1/2011 | Cholewin et al. |
| 2011/0050594 A1* | 3/2011 | Kim .................. G06F 3/04847 345/173 |
| 2011/0057886 A1* | 3/2011 | Ng et al. ....................... 345/173 |
| 2011/0316859 A1* | 12/2011 | Nikula ............... G06F 3/04883 345/473 |
| 2012/0068929 A1* | 3/2012 | Kim ..................... G06F 3/0338 345/163 |
| 2012/0075241 A1* | 3/2012 | Bao ......................... H01L 29/84 345/174 |
| 2012/0105358 A1* | 5/2012 | Momeyer ............. G06F 3/0414 345/174 |
| 2012/0180001 A1* | 7/2012 | Griffin ............... G06F 3/04883 715/863 |

FOREIGN PATENT DOCUMENTS

| | | |
|---|---|---|
| JP | 2011-100385 | 5/2011 |
| JP | 2011-107738 | 6/2011 |
| KR | 10-1999-0064226 | 7/1999 |
| KR | 10-2003-0090732 | 11/2003 |
| KR | 10-2007-0039868 | 4/2007 |
| KR | 10-2009-0028344 | 3/2009 |
| KR | 10-2009-0037652 | 4/2009 |
| KR | 10-2010-0015231 | 2/2010 |
| KR | 10-2010-0018883 | 2/2010 |
| KR | 10-2010-0066036 | 6/2010 |
| KR | 10-2010-0068393 | 6/2010 |
| KR | 10-2010-0090584 | 8/2010 |
| KR | 10-2010-0126905 | 12/2010 |
| KR | 10-2011-0020522 | 3/2011 |
| KR | 10-2011-0030427 | 3/2011 |

* cited by examiner

INTERFACE CONTROLLING APPARATUS AND METHOD USING FORCE

CROSS-REFERENCE TO RELATED APPLICATIONS

This application claims the priority benefit of Korean Patent Application No. 10-2011-0094154, filed on Sep. 19, 2011, in the Korean Intellectual Property Office, the disclosure of which is incorporated herein by reference.

BACKGROUND

1. Field

The following description relates to an interface controlling apparatus and method using a force.

2. Description of the Related Art

A general user interface control technology may employ a method of inputting a control signal by controlling preconfigured hardware such as a keyboard, a joystick, or a button, for example, by using a user gesture such as a contact of a user on a device, for example, or by using spatial kinematic and action information of the user.

The method of inputting the control signal using the user gesture may generate direction information based on a spatial movement of the user. For example, a gesture of searching a large map image for a region of interest or a gesture of moving contact coordinates to scroll a long webpage may be used.

In the case of a general input device, a physically contactable space range is limited and thus, a user may need to repeat a gesture in order to navigate a large virtual workspace.

In the case of the method of inputting the control signal using the spatial kinematic and action information of the user, a physical space for mapping an actual input value may be limited and thus, motions of the user and the input device may interrupt an interaction.

In general, the method of inputting the control signal by controlling the preconfigured hardware, by using the user gesture, or by using the spatial kinematic and action information of the user may visually disclose an input behavior without a separate action.

SUMMARY

The foregoing and/or other aspects are achieved by providing an interface controlling apparatus using a force, the apparatus including an information receiver to receive, from at least one force sensor, force input information associated with at least one input force, an information analyzer to generate content control information by analyzing the force input information, and a content controller to control content based on the content control information.

The information analyzer may determine whether the force input information is greater than a reference value set to control the content, and may generate the content control information when the force input information is greater than the reference value.

The information analyzer may generate the content control information used to determine a scroll direction of a visible area of the content based on the force input information. The content controller may scroll the visible area of the content based on the content control information.

The information analyzer may generate the content control information used to control a visible area of the content to be enlarged or reduced based on a combination of the force input information. The content controller may enlarge or reduce the visible area of the content based on the content control information.

The information analyzer may generate the content control information used to determine an enlargement rate or a reduction rate of the visible area based on a magnitude of force included in the force input information.

The information analyzer may generate the content control information used to determine a selection area with respect to a menu, a folder, or a file of the content based on the force input information. The content controller may determine the selection area with respect to the menu, the folder, or the file of the content based on the content control information.

The information analyzer may generate the content control information used to determine an upper area or a lower area with respect to a menu, a folder, or a file of the content based on a combination of the force input information. The content controller may determine the upper area or the lower area with respect to the menu, the folder, or the file of the content based on the content control information.

The information analyzer may generate the content control information used to determine a search direction or a search section with respect to multimedia of the content based on the force input information. The content controller may determine the search direction or the search section with respect to the multimedia of the content based on the content control information.

The information analyzer may generate the content control information used to determine a previous file or a subsequent file with respect to multimedia of the content based on a combination of the force input information. The content controller may determine the previous file or the subsequent file with respect to the multimedia of the content based on the content control information.

The information analyzer may generate the content control information used to determine a page turning direction with respect to multimedia of the content based on the force input information. The content controller may determine the page turning direction with respect to the multimedia of the content based on the content control information.

The information analyzer may generate the content control information used to control a front page or a last page of the content to be displayed based on a combination of the force input information. The content controller may control the front page or the last page of the content to be displayed based on the content control information.

The information receiver may receive at least one other item of input information. The information analyzer may generate the content control information by combining the force input information and the at least one other item of input information.

The at least one other item of input information may include at least one of contact input information or acceleration information, angular velocity information, and geomagnetic information.

The information analyzer may generate the content control information by combining the force input information and the contact input information. The content controller may determine a target of the content based on the contact input information and may control the determined target based on the force input information.

The information analyzer may generate the content control information by combining the force input information with the acceleration information, the angular velocity information, or the geomagnetic information. The content controller may move a target of the content based on the acceleration information, the angular velocity information, or the geomagnetic information, and may change a size of the target based on the force input information.

The force input information may include at least one of an action point of force that is input to the at least one force sensor, a direction of force, a magnitude of force, and a time duration of force.

The foregoing and/or other aspects may be achieved by providing an interface controlling apparatus using a force, the apparatus including a contact pad to receive force input information by a user contact, at least one force sensor to measure force input information about a contact area where the user contact occurs, a base to support the at least one force sensor and a content control processor to generate content control information by analyzing the force input information, and to control content based on the content control information.

The foregoing and/or other aspects may be achieved by providing an interface controlling method using a force, the method including receiving, from at least one force sensor, force input information associated with at least one input force, generating content control information by analyzing the force input information, and controlling content based on the content control information.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
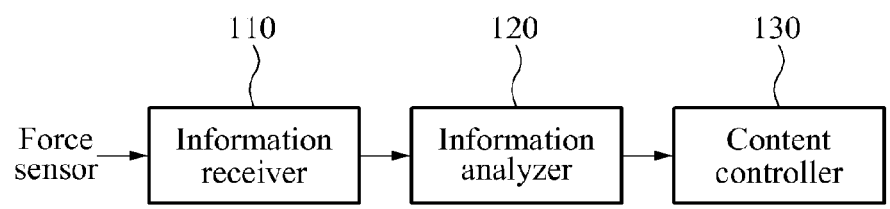
FIG. 1 illustrates a configuration of an interface controlling apparatus using a force according to an embodiment.

Reference will now be made in detail to embodiments, examples of which are illustrated in the accompanying drawings, wherein like reference numerals refer to like elements throughout. Embodiments are described below to explain the present disclosure by referring to the figures.

When the detailed description is related to a known function or configuration that may make the purpose of the following disclosure unnecessarily ambiguous in describing the embodiments, the detailed description will be omitted here. Also, terms used herein are defined to appropriately describe the exemplary embodiments and thus may be changed depending on a user, the intent of an operator, or a custom. Accordingly, the terms must be defined based on the following overall description of this specification.

An interface controlling apparatus according to an embodiment relates to using, as input information, a force that is applied from a user, and to receiving, as input information, a force that is applied to a direction parallel with a contact surface, and to generating content control information.

FIG. 1 illustrates a configuration of an interface controlling apparatus using a force according to an embodiment.

Referring to FIG. 1, the interface controlling apparatus may include an information receiver 110 to receive, from each of at least one force sensor, force input information associated with at least one input force, an information analyzer 120 to generate content control information by analyzing the force input information, and a content controller 130 to control content based on the content control information.

The interface controlling apparatus may control the content based on the content control information that is generated based on the force input information.

According to an aspect, the interface controlling apparatus may control content such as a virtual space, a virtual object, a text, an image, a file, a folder, a window, a web, or an application program, for example.

Figure 2:
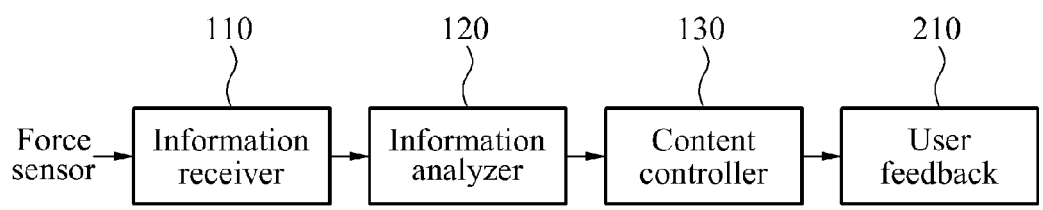
FIG. 2 illustrates an additional configuration of an interface controlling apparatus using a force according to an embodiment.

FIG. 2 illustrates an additional configuration of an interface controlling apparatus using a force according to an embodiment.

Referring to FIG. 2, the interface controlling apparatus may control content and provide user feedback 210 to a user. For example, the interface controlling apparatus may feed back, to the user, a modality such as visual sense, auditory sense, or haptic sense, for example.

Figure 3:
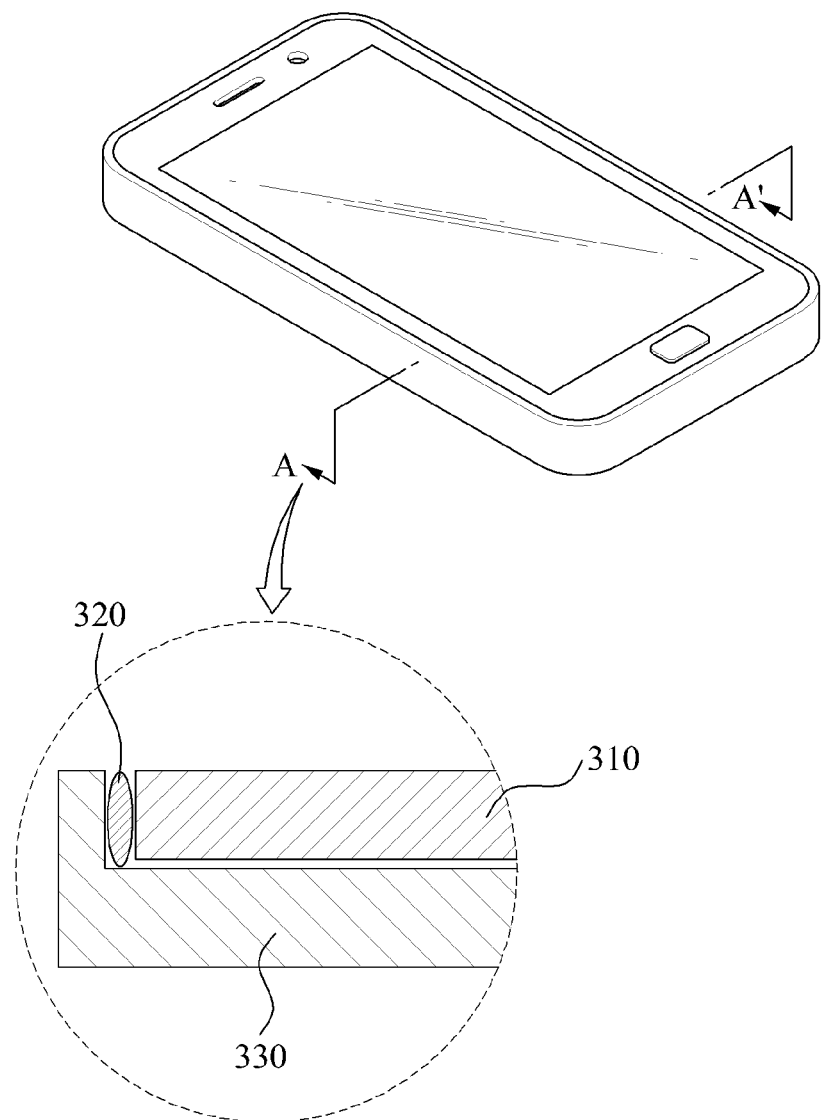
FIG. 3 illustrates an example of a physical configuration of an interface controlling apparatus using a force according to an embodiment.

FIG. 3 illustrates an example of a physical configuration of an interface controlling apparatus using a force according to an embodiment.

Referring to FIG. 3, the interface controlling apparatus may include a contact pad 310 to receive force input information by a user contact, at least one force sensor 320 to measure force input information associated with a contact area where the user contact occurs, a base 330 to support the at least one force sensor 320, and a content control processor (not shown) to generate content control information by analyzing the force input information, and to control content based on the content control information.

According to an aspect, the contact pad 310 may be an independent system such as a module for transferring force input information, for providing a predetermined function such as a display function, or for sensing input information excluding the force such as a temperature, pressure, or electric field, for example, or may be part of a mobile phone.

According to an aspect, the force sensor 320 may include various sensors of which states vary due to applied force. The force sensor 320 may indicate a sensor of a physical state such as a resistance value, capacitance, voltage, magnetic field, optical wavelength, density, temperature, or volume, for example, and is capable of measuring corresponding varying values.

A contact surface between the contact pad 310 and the user may be disposed in a direction facing the user.

FIG. 4A through FIG. 4D illustrate other examples of the force sensor 320 of FIG. 3 according to an embodiment.

Figure 4A:
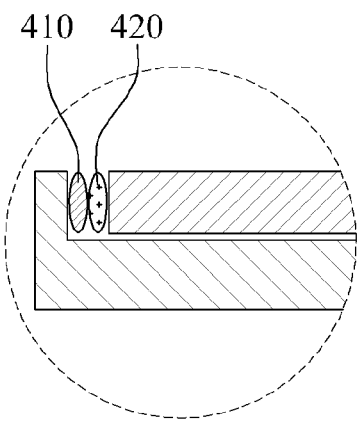
FIG. 4A through FIG. 4D illustrate other examples of a force sensor of FIG. 3 according to an embodiment.
Figure 4B:
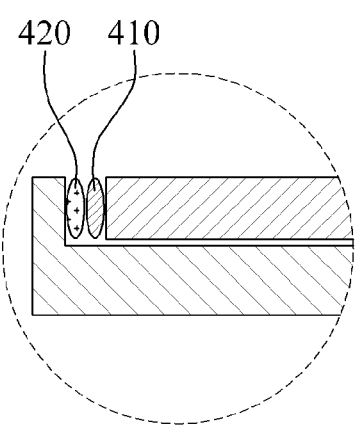

Referring to FIG. 4A and FIG. 4B, to readily transfer force input information, an elastic substance 420 having an elasticity may be disposed around a force sensor 410, or an elastic sensor may be employed as the force sensor 410.

Figure 4C:
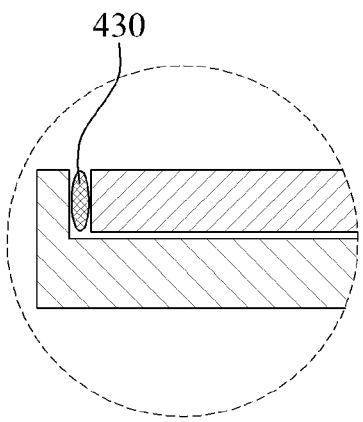

Referring to FIG. 4C, the interface controlling apparatus may measure force input information by disposing a mixed structure 430 of the force sensor 410 and the elastic body 420 between the contact pad 310 and the base 330.

Figure 4D:
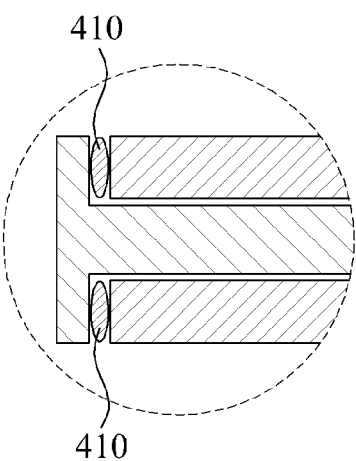
Figure 5A:
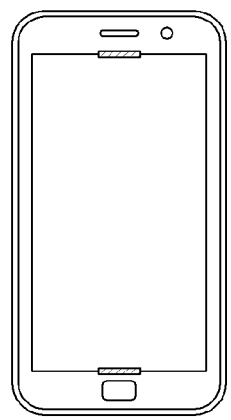
FIG. 5A through FIG. 5E illustrate examples of disposing a plurality of force sensors on an interface controlling apparatus according to an embodiment.
Figure 5B:
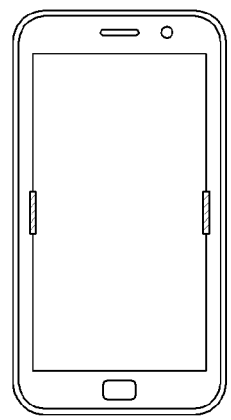
Figure 5C:
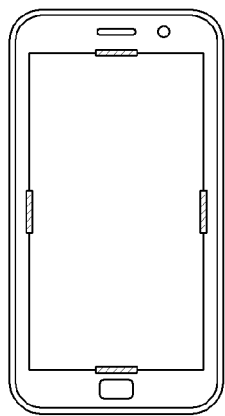
Figure 5D:
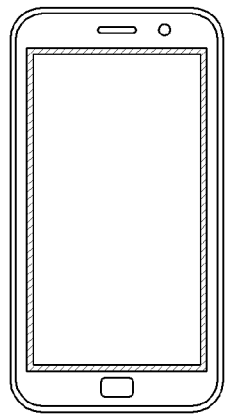
Figure 5E:
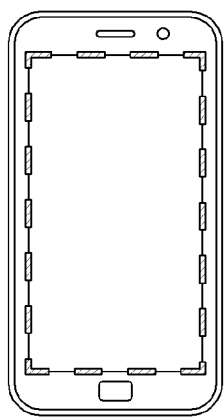
Figure 6A:
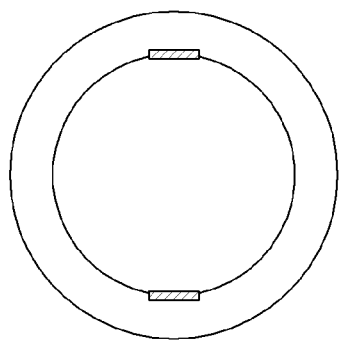
FIG. 6A through FIG. 6F illustrate examples of a base of an interface controlling apparatus according to an embodiment.
Figure 6B:
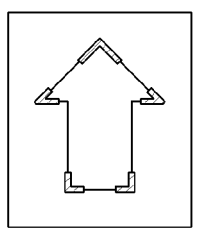
Figure 6C:
Figure 6D:
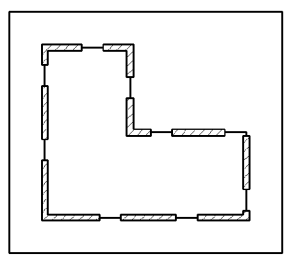
Figure 6E:
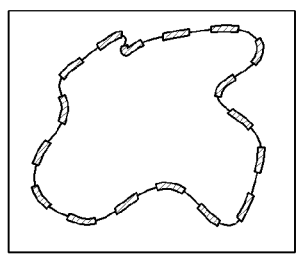
Figure 6F:
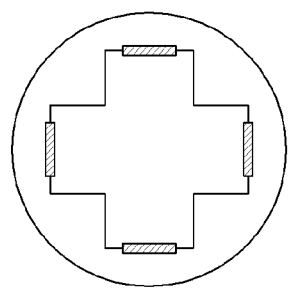
Figure 7A:
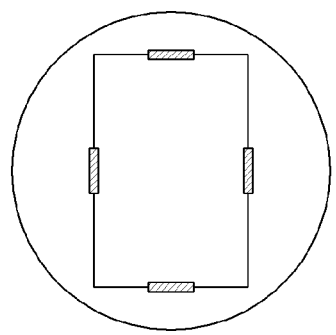
FIG. 7A through FIG. 7E illustrate examples of a contact pad of an interface controlling apparatus according to an embodiment.
Figure 7B:
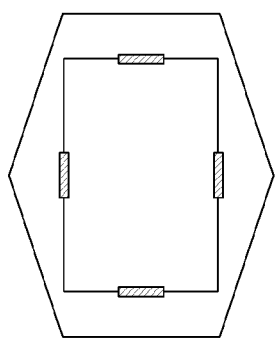
Figure 7C:
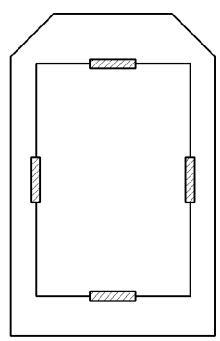
Figure 7D:
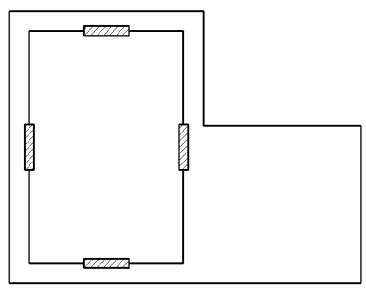
Figure 7E:
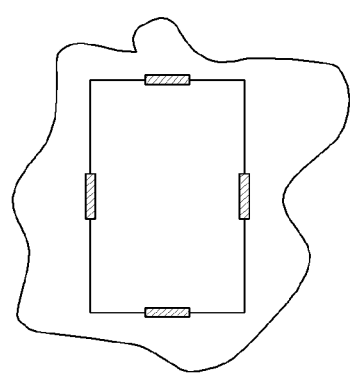

Referring to FIG. 4D, the interface controlling apparatus may measure force input information by disposing a plurality of force sensors 410 between the contact pad 310 and the base 330.

FIG. 5A through FIG. 5E illustrate examples of disposing a plurality of force sensors on an interface controlling apparatus according to an embodiment.

Referring to FIG. 5A through FIG. 5E, the plurality of force sensors 320 may be variously configured by changing the number of force sensors 320 and the arrangement of the force sensors 320, and the plurality of force sensors 320 may be continuously or discretely disposed.

The base 330 may support the force sensor 320 against a force applied via a contact point.

According to an aspect, a shape, material, or size, for example, of the contact pad 310 and the base 330 are not limited.

FIG. 6A through FIG. 6F illustrate examples of a base of an interface controlling apparatus according to an embodiment, and FIG. 7A through FIG. 7E illustrate examples of a contact pad of an interface controlling apparatus according to an embodiment.

Referring to FIG. 6A through FIG. 6F and FIG. 7A through FIG. 7E, the contact pad 310 and the base 330 of the interface controlling apparatus may be provided in various shapes such as a curve, straight line, or curved surface, for example. In the following, for ease of understanding, a description will be made based on an example in that the contact pad 310 and the base 330 are provided in a rectangular shape, and a corner of each part forms a right angle.

Figure 8:
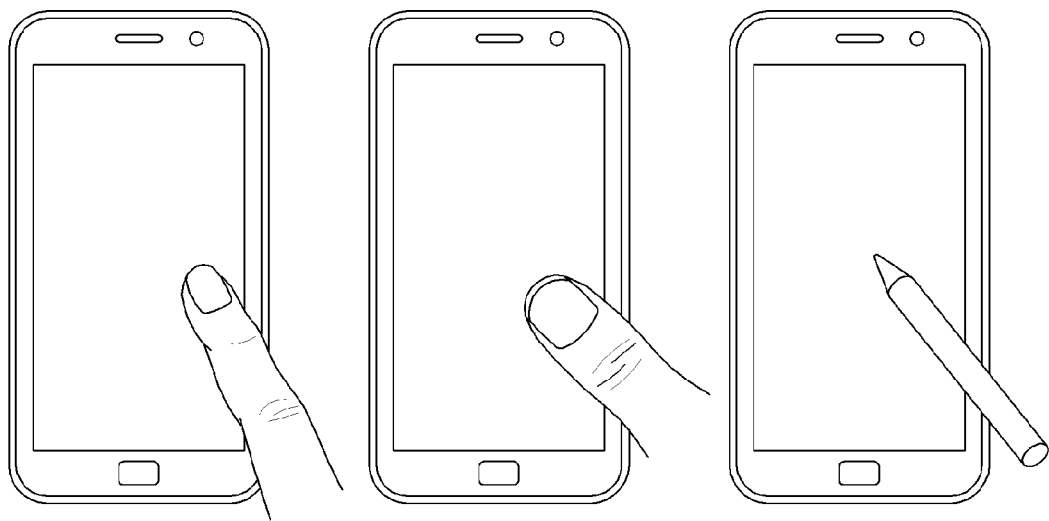
FIG. 8 illustrates an example of applying a physical interaction to an interface controlling apparatus according to an embodiment.

FIG. 8 illustrates an example of applying a physical interaction to an interface controlling apparatus according to an embodiment.

Referring to FIG. 8, to apply force input information to the interface controlling apparatus, a user may apply a force using a part of a human body such as a finger, for example, or may apply a force using an instrument such as a pen, for example.

The interface controlling apparatus may generate content control information by computing information such as an action point of force, a direction of force, and a magnitude of force based on an appearance, the number of force sensors 320, the arrangement of the force sensors 320, or a duration time of force, for example.

Force input information may include the action point, the direction, the strength, or the duration time, for example, with respect to the force that is input to at least one force sensor 320.

FIG. 9 through FIG. 13 illustrate examples of measuring a force using an interface controlling apparatus according to an embodiment.

Figure 9:
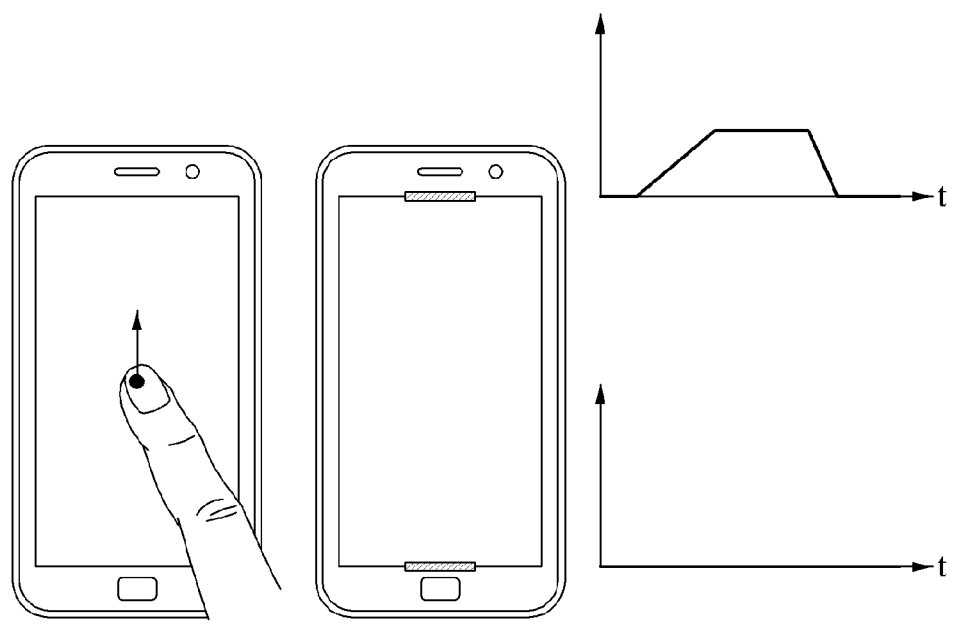
FIG. 9 through FIG. 13 illustrate examples of measuring a force using an interface controlling apparatus according to an embodiment.

Referring to FIG. 9, when the interface controlling apparatus indicates a direction in which a force is being applied, a signal of the force sensor 320 being compressed may be output as shown in the graph on the right side.

Figure 10:
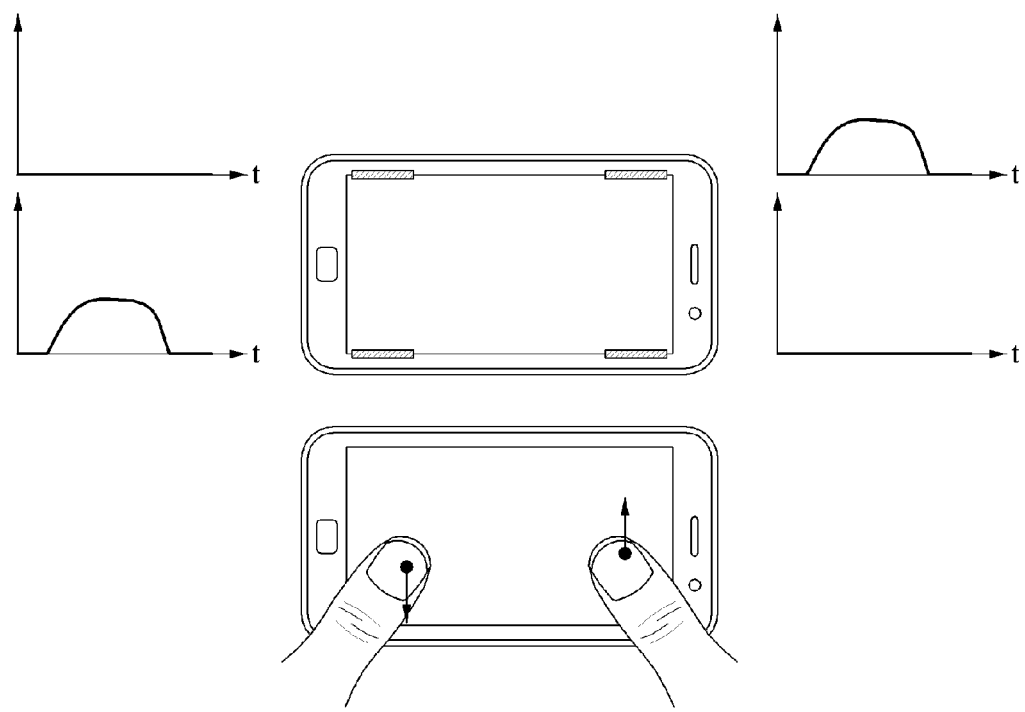

Referring to FIG. 10, when a force for generating a rotating moment is applied to at least two points of the contact pad 310 of the interface controlling apparatus, a signal of the force sensor 320 along the direction of the moment may be output as shown in the graph on the right side.

Figure 11:
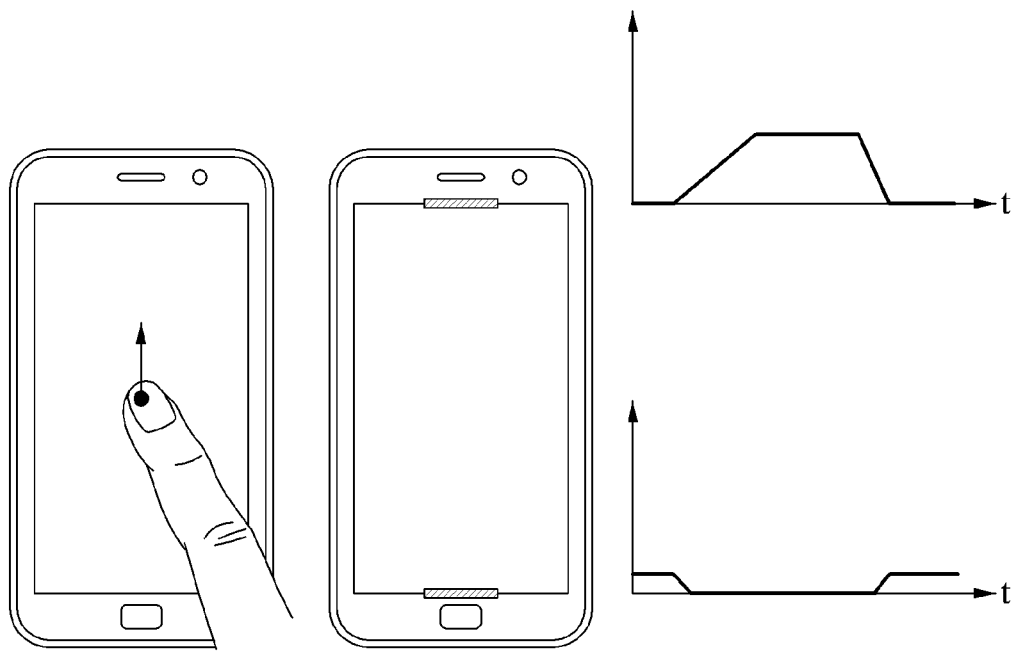

Referring to FIG. 11, the interface controlling apparatus may detect a signal through a pressure so that a predetermined offset may occur.

The interface controlling apparatus may compute a direction of force or a direction of moment applied via the force sensor 320, and may directly use a computed value or may identify a predetermined direction based on the computed value.

The interface controlling apparatus may express the direction of force using a unit such as a degree or a rad, up/down/left/right, east/west/south/north, 8 azimuth, or a time, for example.

The interface controlling apparatus may compute a magnitude of force applied via the force sensor 320, and may directly use a computed value or may express a predetermined strength of level based on the computed value.

The interface controlling apparatus may express the magnitude of force using a physical unit such as a voltage, Newton (N), or psi, for example, or may express the magnitude of force using high/low, strong/medium/weak, or levels such as 1 to 5, for example.

The interface controlling apparatus may compute a time duration in which the force applied via the force sensor 320 is maintained, and may directly use a computed value or may express the time duration based on the computed value.

The interface controlling apparatus may compute the time duration using a physical unit that indicates a time such as a second, for example, or may express the time duration using short/long, or levels of 1 to 3, for example.

The interface controlling apparatus may compute the time duration in which the force applied via the force sensor 320 is maintained, and may define an input of continuous sequential force.

Figure 12:
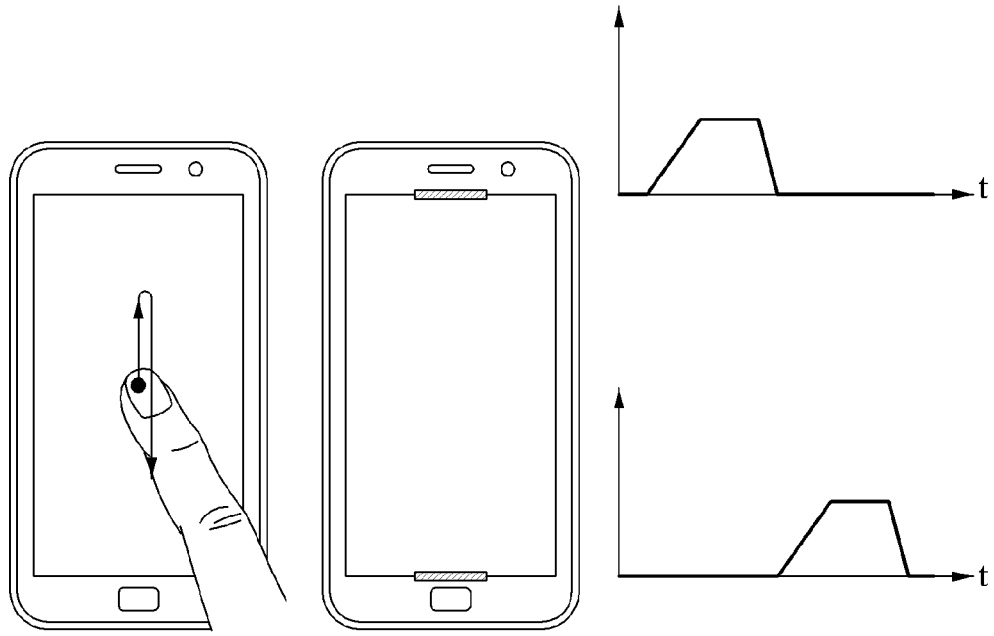
Figure 13:
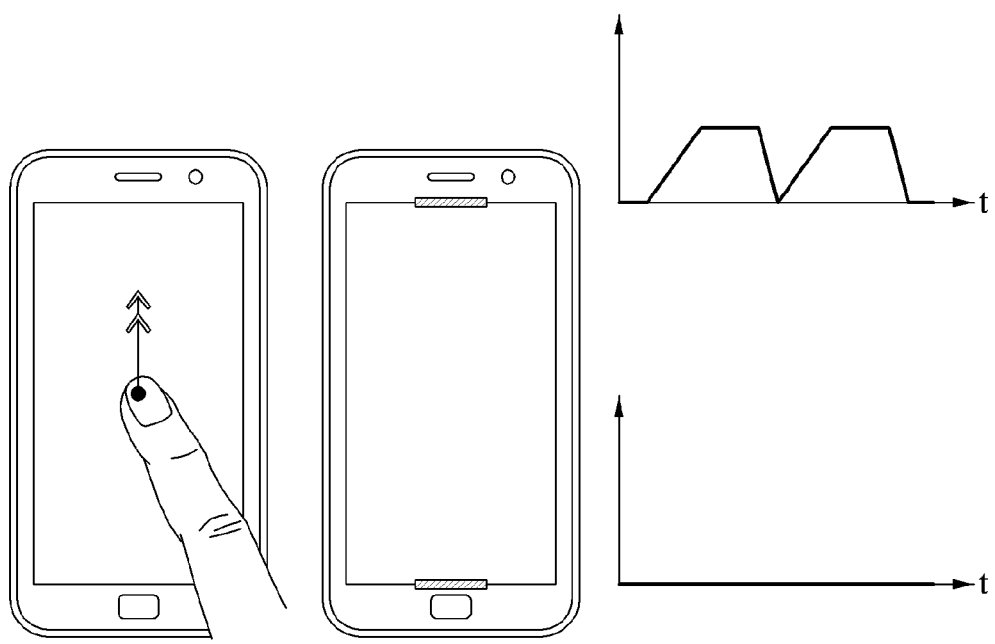

The interface controlling apparatus may recognize a force that is continuously applied to different directions of FIG. 12 or the same direction of FIG. 13, and may differently control content.

Figure 14:
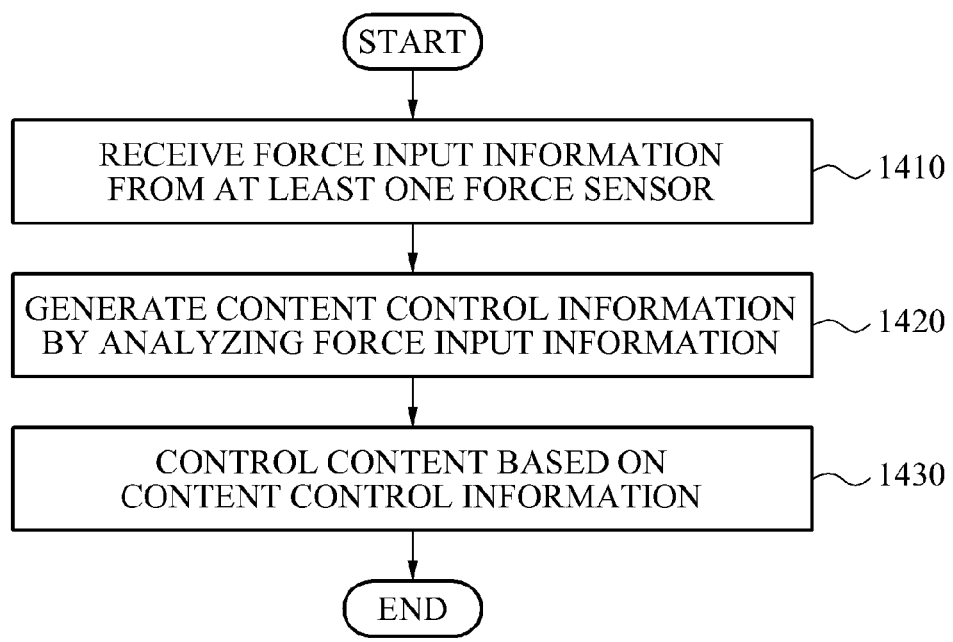
FIG. 14 illustrates an interface controlling method using a force according to an embodiment.

FIG. 14 illustrates an interface controlling method using a force according to an embodiment.

Referring to FIG. 14, the interface controlling method using the force may be performed as follows.

In operation 1410, the interface controlling apparatus may receive, from at least one force sensor, force input information associated with at least one input force.

In operation 1420, the interface controlling apparatus may generate content control information by analyzing the force input information.

The interface controlling apparatus may determine whether force input information satisfies a predetermined criterion, and may control an operation corresponding to the predetermined criterion to be executed when the force input information satisfies the predetermined criterion.

Using the information analyzer 120, the interface controlling apparatus may determine whether the force input information is greater than a reference value set to control the content, and may generate the content control information when the force input information is greater than the reference value.

In operation 1430, the interface controlling apparatus may control the content based on the content control information.

Hereinafter, examples of the interface controlling method using the force will be described.

The interface controlling apparatus may control a visible area of content.

Figure 15:
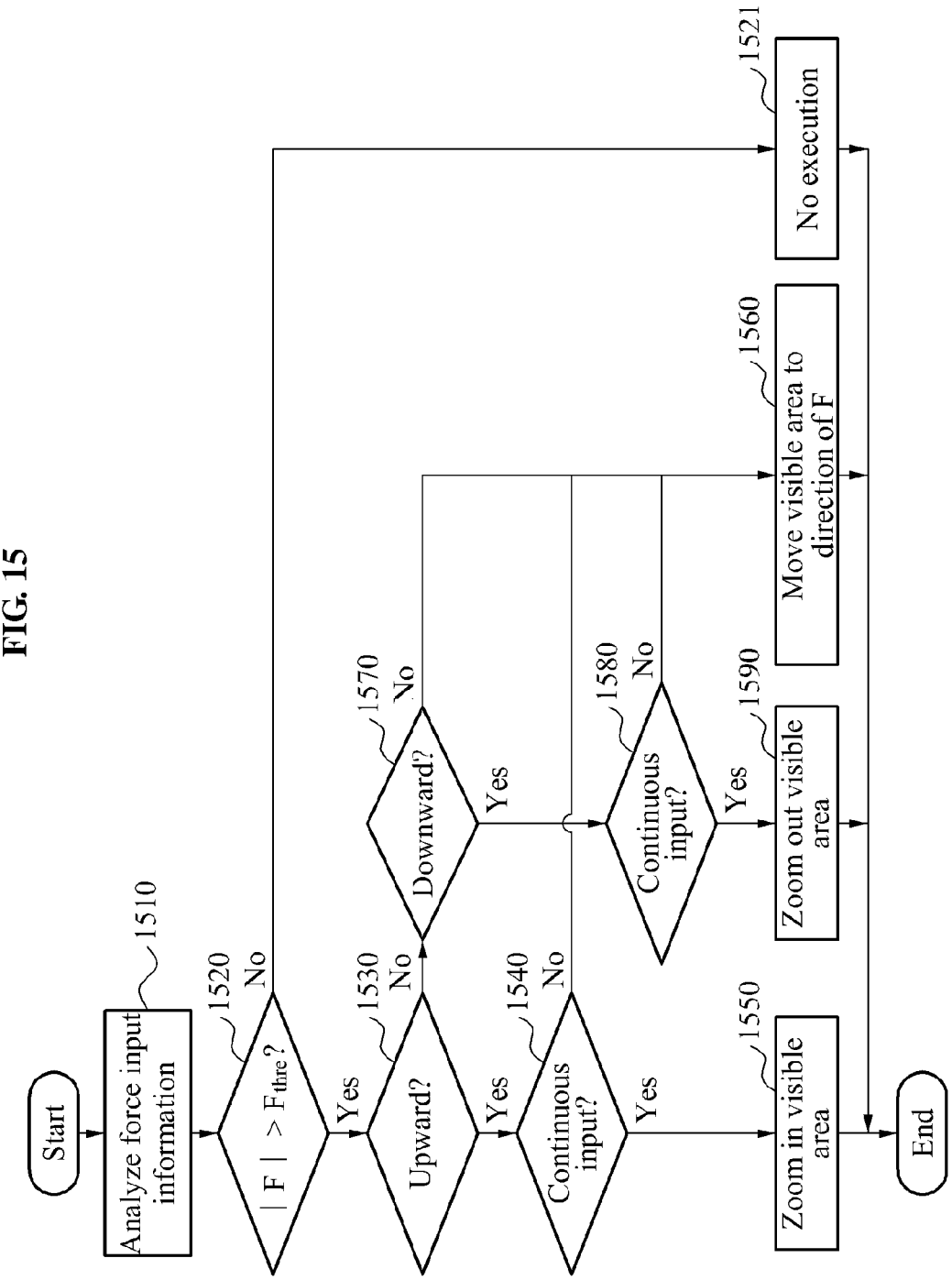
FIG. 15 illustrates a method of controlling a visible area of content according to an embodiment.

FIG. 15 illustrates a method of controlling a visible area of content according to an embodiment.

Referring to FIG. 15, the interface controlling apparatus may analyze force input information in operation 1510, and may determine whether an absolute value |F| with respect a magnitude of force is greater than a predetermined value $F_{thre}$ in operation 1520.

When the absolute value |F| is less than $F_{thre}$, the interface controlling apparatus may determine that the input force is not intended and thus, may not execute the content control in operation 1521.

On the contrary, when the absolute value |F| is greater than $F_{thre}$, the interface controlling apparatus may determine a direction of force and whether force is continuously input and thereby move or zoom in or zoom out the visible area of content.

Using the information analyzer 120, the interface controlling apparatus may generate content control information used to determine a scroll direction of the visible area of content based on the force input information.

Using the content controller 130, the interface controlling apparatus may scroll the visible area of content based on the content control information.

For example, the interface controlling apparatus may determine whether the direction of applied force is upward or downward in operations 1530 and 1570, and may determine whether the force input information corresponds to the continuous input in operations 1540 and 1580.

Figure 16:
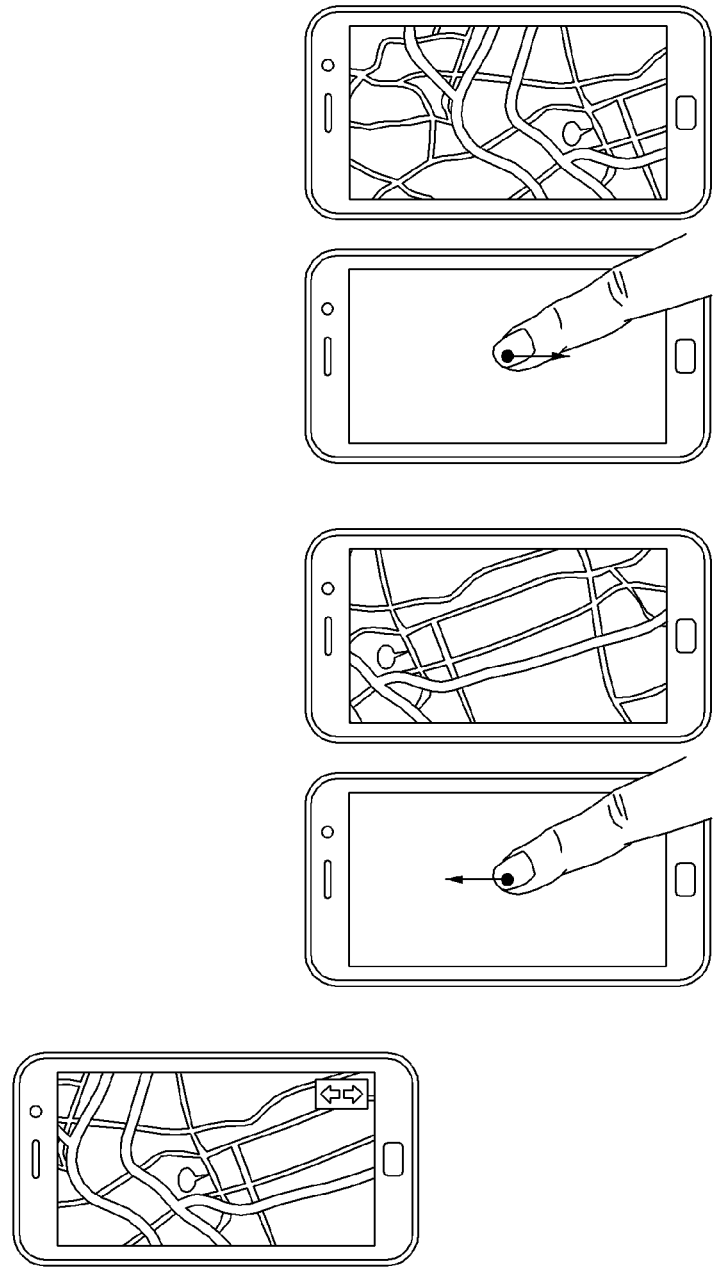
FIG. 16 and FIG. 17 illustrate examples of controlling a visible area of content according to an embodiment.
Figure 17:
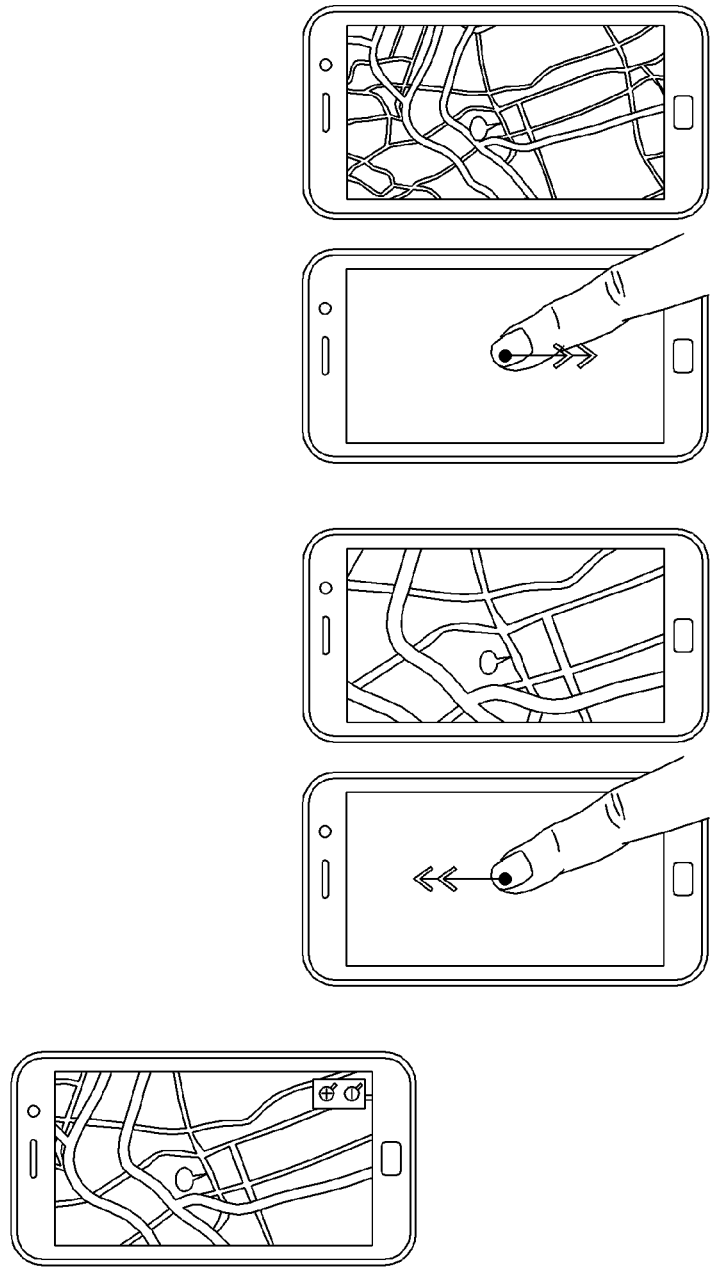

FIG. 16 and FIG. 17 illustrate examples of controlling a visible area of content according to an embodiment.

The interface controlling apparatus may continuously scroll the visible area of content by matching a direction of force applied by a user and a movement direction of content to be displayed.

Referring to FIG. 16, as an analysis result of force input information, when the direction of force is upward and when the force input information corresponds to a single input, the interface controlling apparatus may move the visible area of content upward corresponding to the direction of applied force.

As the analysis result of force input information, when the direction of force is downward and when the force input information corresponds to the single input, the interface controlling apparatus may move the visible area of content downward in operation 1560.

The direction of force is not limited to upward and downward and thus, the interface controlling apparatus may move the visible area of content by recognizing all of two-dimensional (2D) or three-dimensional (3D) directions of force.

The interface controlling apparatus may continuously drag the content by controlling the direction of force applied by the user and the movement direction of content to be displayed to be opposite to each other.

The interface controlling apparatus may control a movement speed or a change speed of content by analyzing a magnitude of force.

The interface controlling apparatus may zoom in or zoom out the content along the direction of force applied by the user.

Using the information analyzer 120, the interface controlling apparatus may generate content control information used to enlarge or reduce the visible area of content based on a combination of force input information.

Using the content controller 130, the interface controlling apparatus may enlarge or reduce the visible area of content based on the content control information.

The interface controlling apparatus may operate in a predetermined mode to enlarge or reduce the content, and may also enlarge or reduce the content based on a combination of predetermined sequential force input information.

Referring to FIG. 17, as the analysis result of force input information, when the direction of force is upward and when the force input information corresponds to the continuous input, the interface controlling apparatus may zoom in and display the visible area of content in operation 1550.

As the analysis result of force input information, when the direction of the force is downward and when the force input information corresponds to the continuous input, the interface controlling apparatus may zoom out and display the visible area of content in operation 1590.

The interface controlling apparatus may determine whether the magnitude of force applied by the user is within the range of a predetermined minimum value or maximum value. Unless the magnitude of force is out of the range, the interface controlling apparatus may control an enlargement speed or a reduction speed based on a zoom rate corresponding to the magnitude of force.

Using the information analyzer 120, the interface controlling apparatus may determine an enlargement rate or a reduction rate of the visible area of content based on the magnitude of force included in the force input information.

Figure 18:
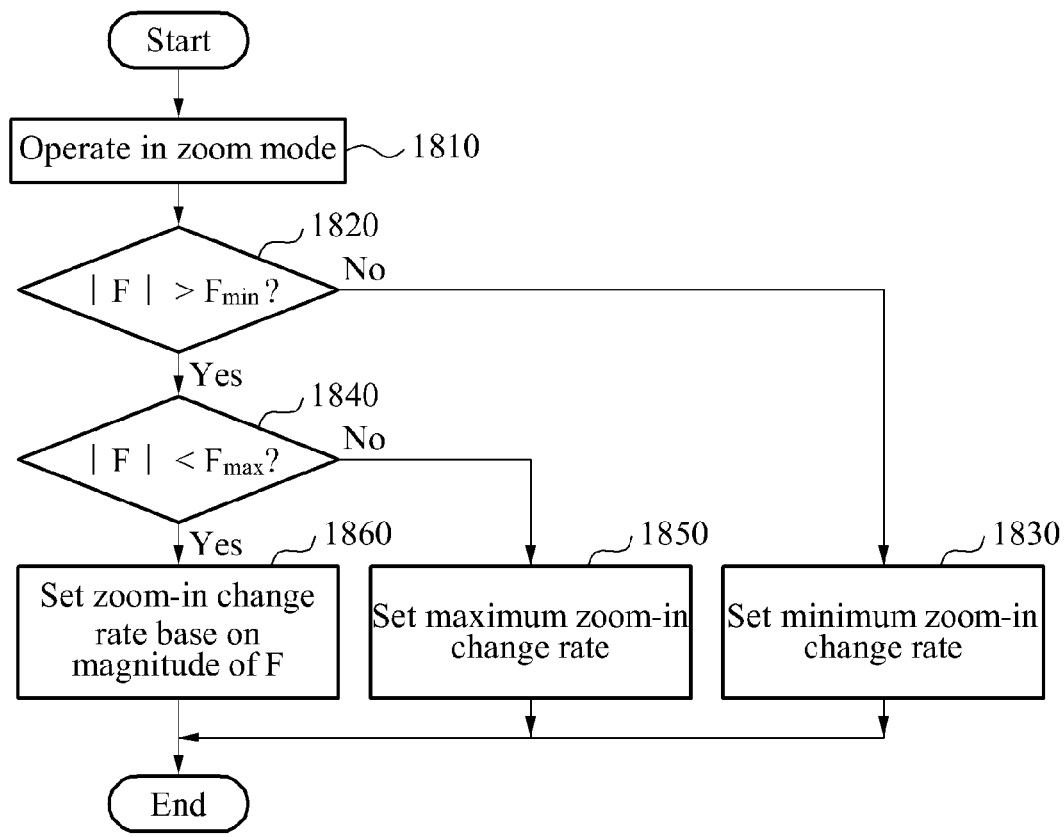
FIG. 18 illustrates a method of controlling an enlargement rate of a visible area of content according to an embodiment.

FIG. 18 illustrates a method of controlling an enlargement rate of a visible area of content according to an embodiment.

Referring to FIG. 18, when the interface controlling apparatus operates in a zoom mode in operation 1810, the interface controlling apparatus may determine whether an absolute value |F| with respect to a magnitude of force is within the range of a minimum value $F_{min}$ or a maximum value $F_{max}$, for example, whether the absolute value |F| is greater than the minimum value $F_{min}$ in operation 1820, and whether the absolute value |F| is less than the maximum value $F_{max}$ in operation 1840.

When the absolute value |F| is less than the minimum value $F_{min}$, the interface controlling apparatus may enlarge the visible area of content by setting a minimum zoom-in change rate in operation 1830.

When the absolute value |F| is greater than the minimum value $F_{min}$ and when the absolute value |F| is greater than the maximum value $F_{max}$, the interference controlling apparatus may enlarge the visible area of content by setting a maximum zoom-in change rate in operation 1850.

When the absolute value |F| is greater than the minimum value $F_{min}$ and when the absolute value |F| is less than the maximum value $F_{max}$, the interface controlling apparatus may enlarge the visible area of content by setting a zoom-in change rate based on the magnitude of force in operation 1860.

The interface controlling apparatus may determine a selection item of content by analyzing force input information.

Using the information analyzer 120, the interface controlling apparatus may generate content control information used to determine an upper area or a lower area with respect to a menu, a folder, or a file of content based on a combination of the force input information.

Using the content controller 130, the interface controlling apparatus may determine the upper area or the lower area with respect to the menu, the folder, or the file of content based on the content control information.

Figure 19:
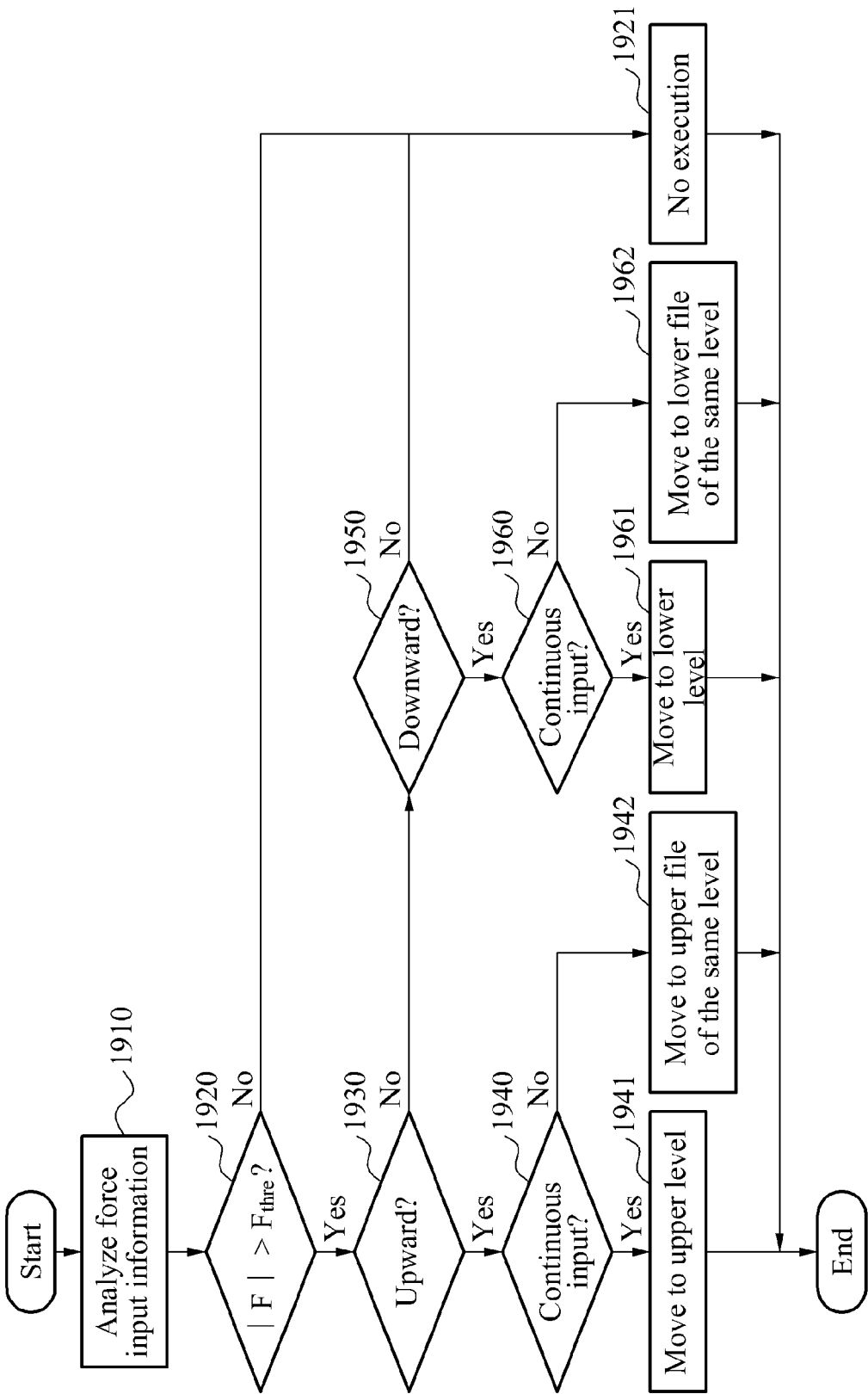
FIG. 19 illustrates a method of determining a selection item of content according to an embodiment.

FIG. 19 illustrates a method of determining a selection item of content according to an embodiment.

The interface controlling apparatus may analyze force input information in operation 1910, and may determine whether an absolute value |F| with respect to a magnitude of force is greater than a predetermined value $F_{thre}$ in operation 1920.

When the absolute value |F| is less than $F_{thre}$, the interference controlling apparatus may determine that the input force is not intended and thus, may not execute the content control in operation 1921.

On the contrary, when the absolute value |F| is greater than $F_{thre}$, the interference controlling apparatus may determine a direction of force and whether the force is continuously input, and thereby determine the selection item of content.

Using the information analyzer 120, the interface controlling apparatus may generate content control information used to determine a selection area with respect to a menu, a folder, or a file of content based on the force input information.

Using the content controller 130, the interface controlling apparatus may determine the selection area with respect to the menu, the folder, or the file of content based on the content control information.

For example, the interface controlling apparatus may determine whether the direction of applied force is upward or downward in operations 1930 and 1950, and may determine whether the force input information corresponds to the continuous input in operations 1940 and 1960.

Figure 20:
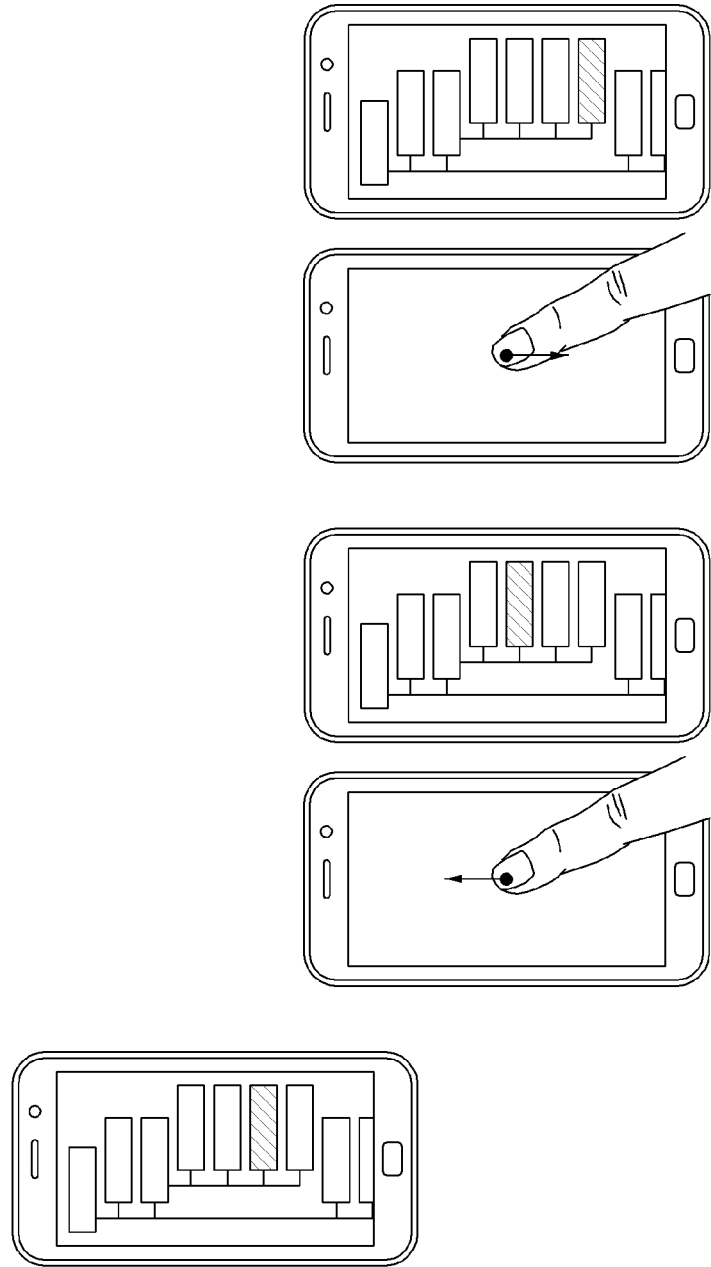
FIG. 20 through FIG. 22 illustrate examples of determining a selection item of content according to an embodiment.
Figure 21:
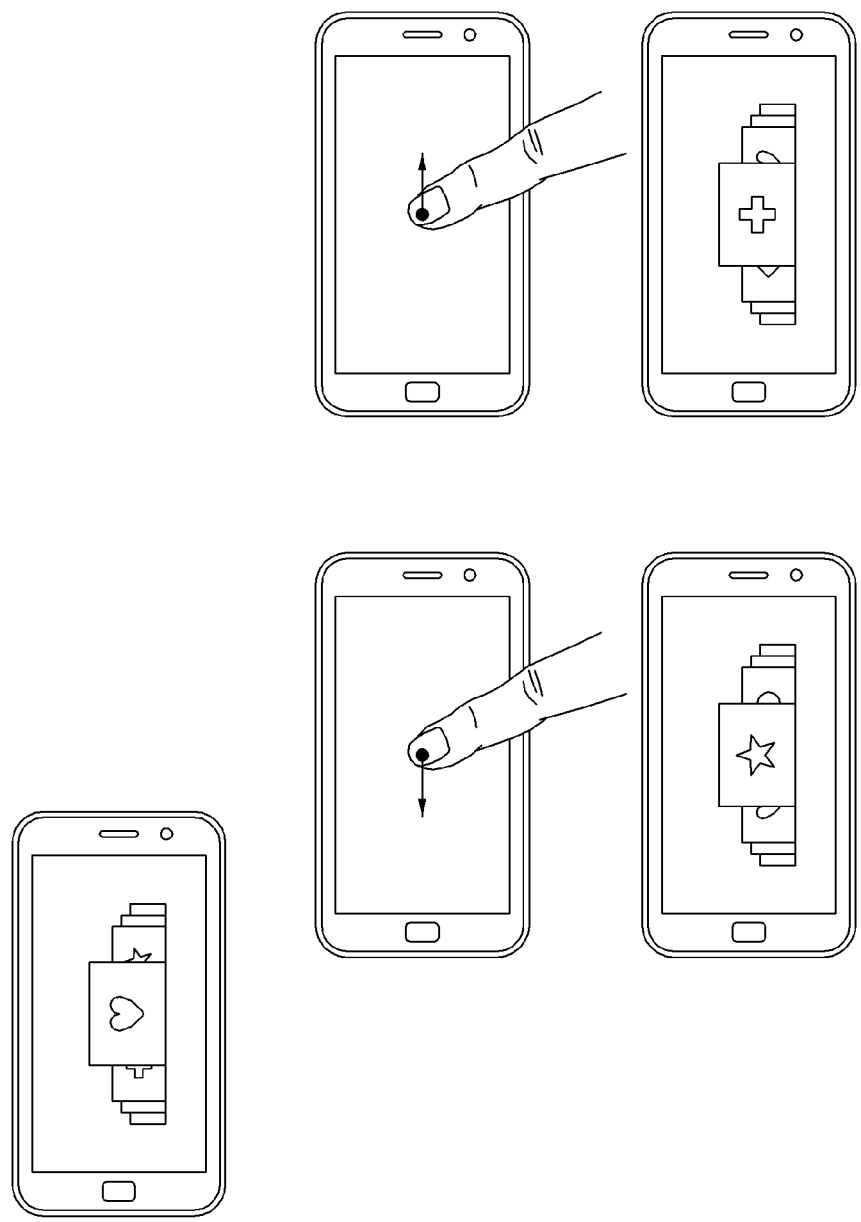
Figure 22:
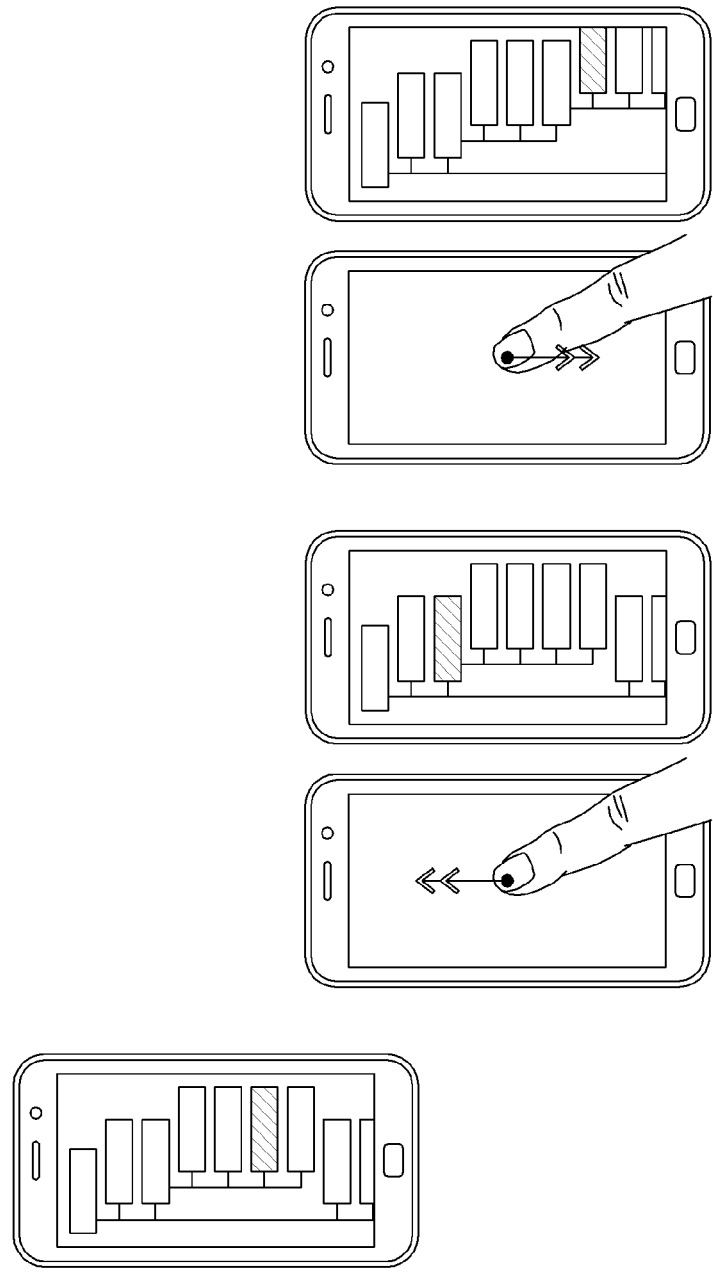

FIG. 20 through FIG. 22 illustrate examples of determining a selection item of content according to an embodiment.

The interface controlling apparatus may determine the selection item of content by matching a direction of force applied by a user and a movement direction of content to be displayed.

Referring to FIG. 20 and FIG. 21, as an analysis result of force input information, when the direction of force is upward and when the force input information corresponds to a single input, the interface controlling apparatus may move the selection item to an upper file of the same level in operation 1942.

As the analysis result of force input information, when the direction of force is downward and when the force input information corresponds to the single input, the interference controlling apparatus may move the selection item of content to a lower file of the same level in operation 1962.

The direction of force is not limited to upward and downward and thus, the interface controlling apparatus may determine the selection item of content by recognizing all 2D or 3D directions of force.

The interface controlling apparatus may move a selection cursor with respect to a menu, a folder, or a file of the same level along a direction of force applied by the user.

The interface controlling apparatus may continuously drag the content by controlling the direction of force applied by the user and the movement direction of content to be displayed to be opposite to each other.

The interface controlling apparatus may control a movement speed or a change speed of content by analyzing the magnitude of force.

When the content is displayed in a horizontal direction as shown in FIG. 21, instead of being displayed in a vertical direction, the interface controlling apparatus may determine whether the direction of force is left or right and thereby determine the selection item of content.

Referring to FIG. 22, as the analysis result of force input information, when the direction of force is upward and when the force input information corresponds to the continuous input, the interface controlling apparatus may move the selection item of content to an upper level in operation 1941.

As the analysis result of force input information, when the direction of force is downward and when the force input information corresponds to the continuous input, the interface controlling apparatus may move the selection item of content to a lower level in operation 1961.

The interface controlling apparatus may control a movement speed of the selection cursor with respect to the menu, the folder, or the file by analyzing the magnitude of force.

Figure 23:
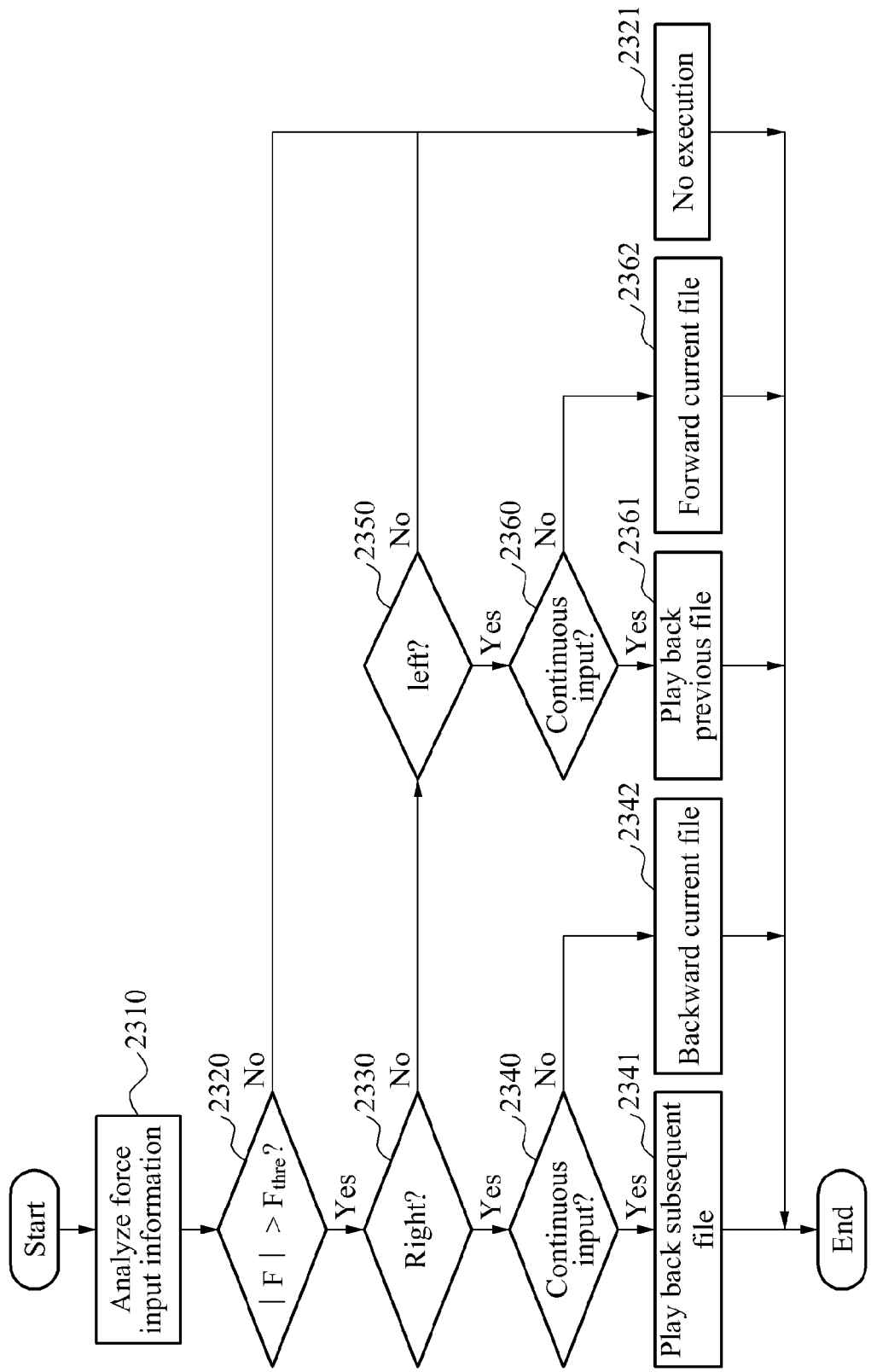
FIG. 23 illustrates a method of controlling multimedia content of content according to an embodiment.

FIG. 23 illustrates a method of controlling multimedia content according to an embodiment.

Referring to FIG. 23, the interface controlling apparatus may analyze force input information in operation 2310, and may determine whether an absolute value |F| with respect to a magnitude of force is greater than a predetermined value $F_{thre}$ in operation 2320.

When the absolute value |F| is less than $F_{thre}$, the interference controlling apparatus may determine that the input force is not intended and thus, may not execute the content control in operation 2321.

On the contrary, when the absolute value |F| is greater than $F_{thre}$, the interference controlling apparatus may determine a direction of force and whether the force is continuously input and thereby control multimedia content.

Using the information analyzer 120, the interface controlling apparatus may generate content control information used to determine a search direction or a search section with respect to multimedia of content based on the force input information.

Using the content controller 130, the interface controlling apparatus may determine the search direction or the search section with respect to multimedia of content based on the content control information.

Using the information analyzer 120, the interface controlling apparatus may generate the content control information used to determine a previous file or a subsequent file with respect to multimedia of content based on a combination of the force input information.

Using the content controller 130, the interface controlling apparatus may determine the previous file or the subsequent file with respect to multimedia of content based on the content control information.

For example, the interface controlling apparatus may determine whether the direction of applied force is left or right in operations 2330 and 2350, and may determine whether the force input information corresponds to the continuous input in operations 2340 and 2360.

Figure 24:
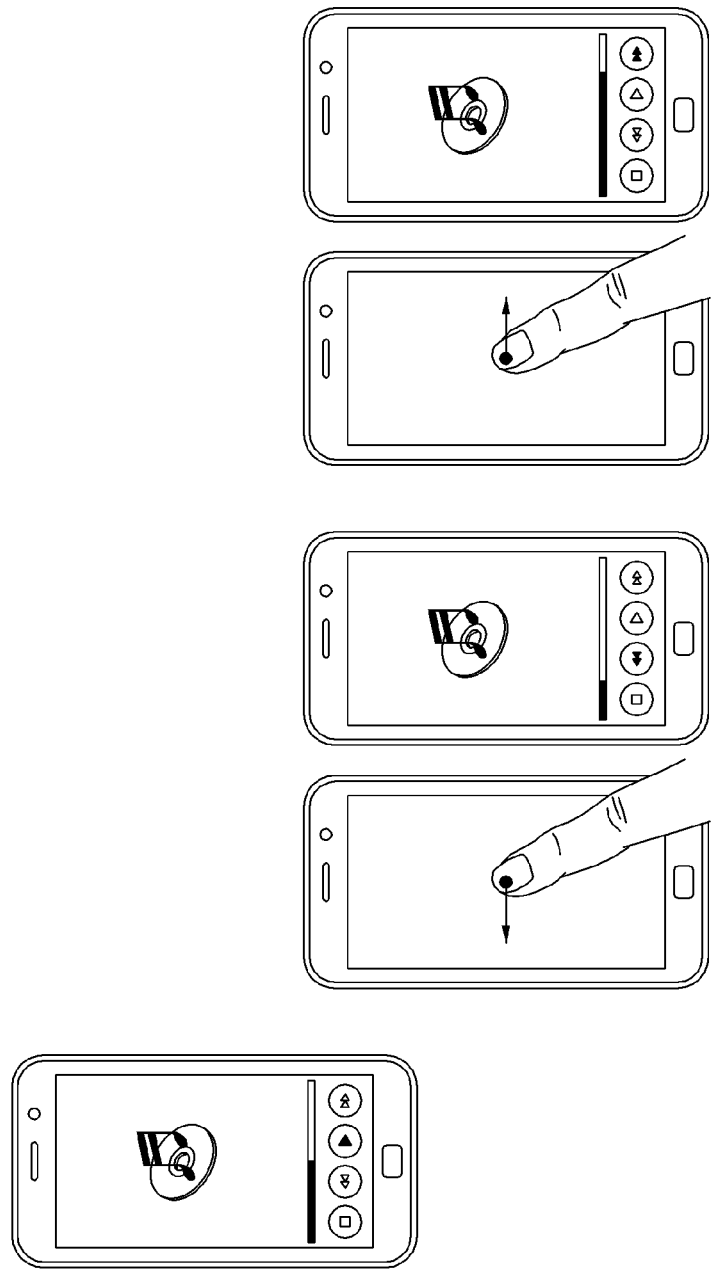
FIG. 24 and FIG. 25 illustrate examples of controlling multimedia content according to an embodiment.
Figure 25:
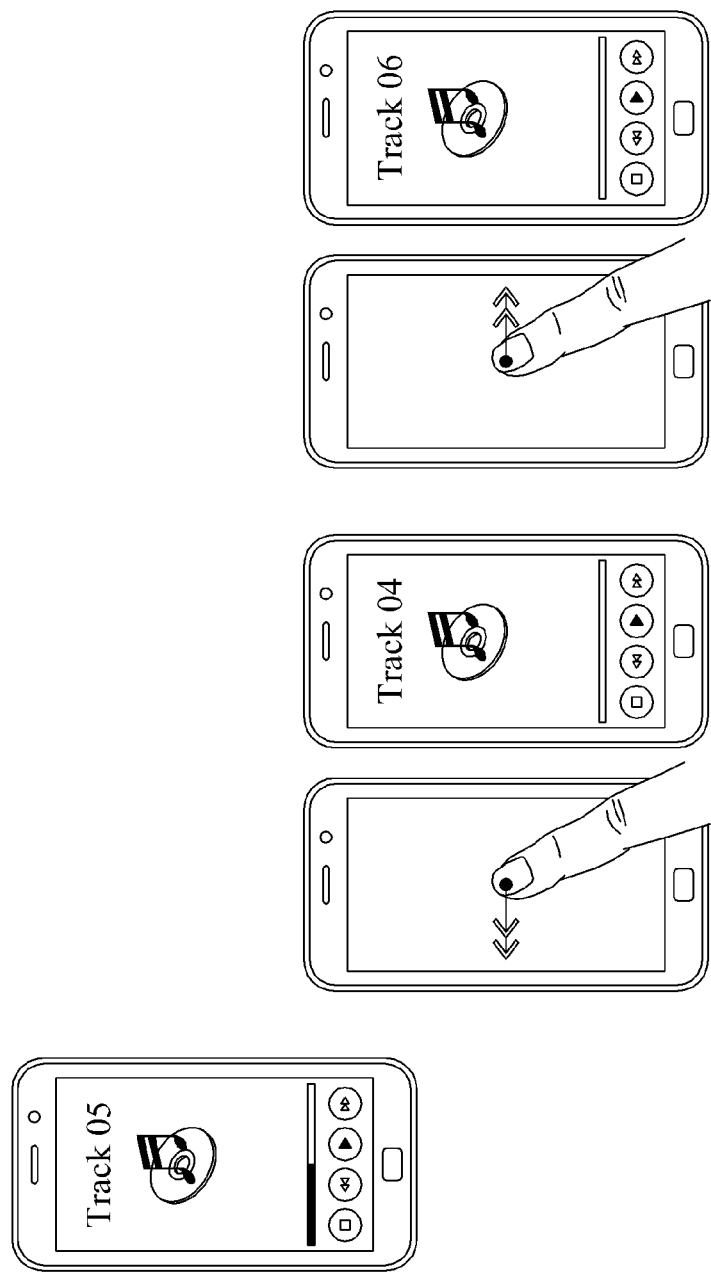

FIG. 24 and FIG. 25 illustrate examples of controlling multimedia content according to an embodiment.

The interface controlling apparatus may control multimedia content by matching a direction of force applied by a user and a movement direction of content to be displayed.

Referring to FIG. 24, as an analysis result of force input information, when the direction of force is right and when the force input information corresponds to a single input, the interface controlling apparatus may control a current file to go backward in operation 2342.

As the analysis result of force input information, when the direction of force is left and when the force input information corresponds to the single input, the interface controlling apparatus may control the current file to go forward in operation 2362.

The direction of force is not limited to right and left and thus, the interface controlling apparatus may determine the selection item of content by recognizing all 2D or 3D directions of force.

Referring to FIG. 25, as the analysis result of force input information, when the direction of force is right and when the force input information corresponds to the continuous input, the interface controlling apparatus may control a subsequent file to be played back in operation 2341.

As the analysis result of force input information, when the direction of force is left and when the force input information corresponds to the continuous input, the interface controlling apparatus may control a previous file to be played back in operation 2361.

The interface controlling apparatus may control multimedia content by matching the direction of applied force and the search direction.

The interface controlling apparatus may adjust a search speed, playback speed rate, level of volume, or amount of brightness, for example, by analyzing the magnitude of force.

Figure 26:
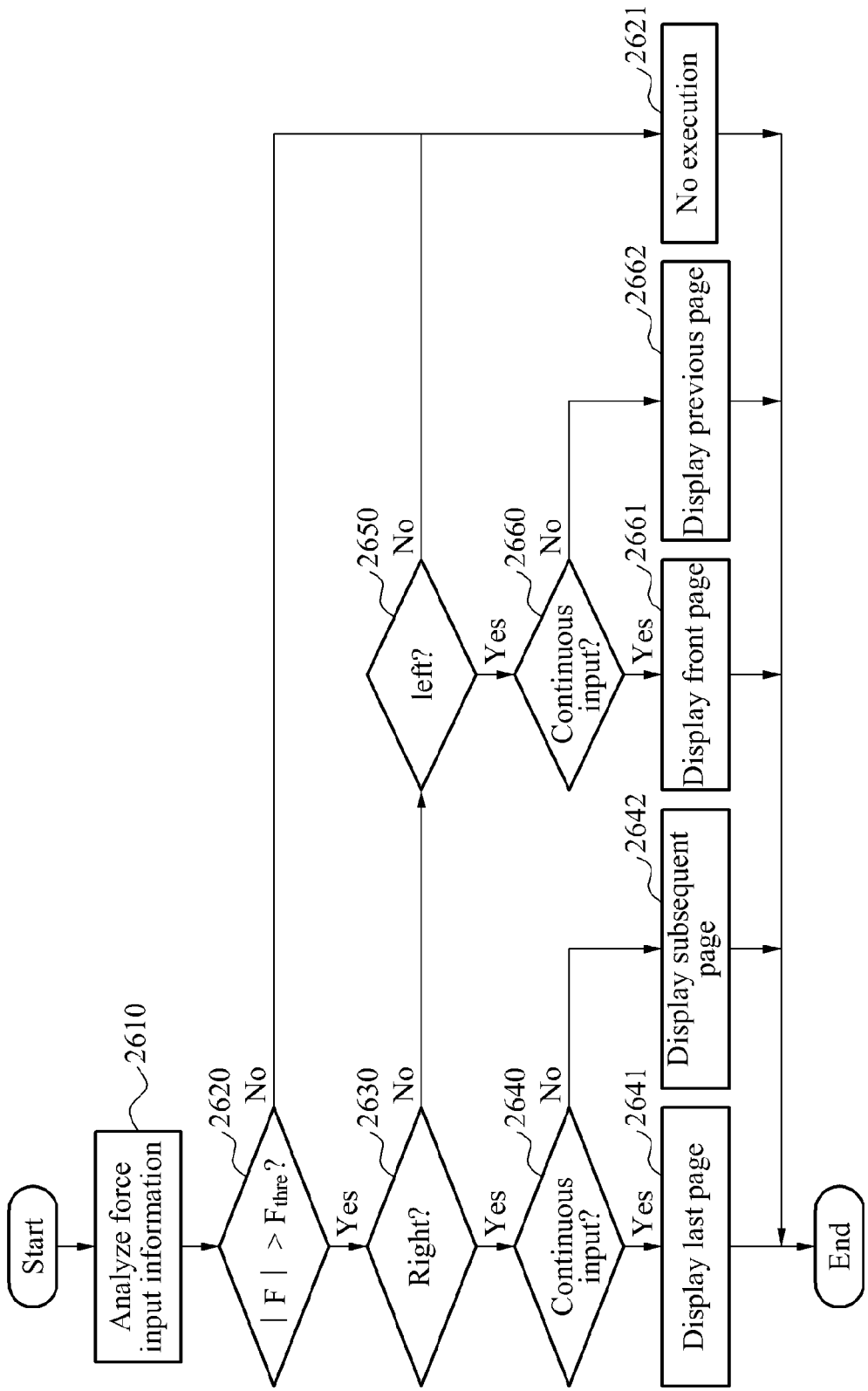
FIG. 26 illustrates a method of controlling multimedia content of content according to another embodiment.

FIG. 26 illustrates a method of controlling multimedia content according to another embodiment.

Referring to FIG. 26, the interface controlling apparatus may analyze force input information in operation 2610, and may determine whether an absolute value |F| with respect to a magnitude of force is greater than a predetermined value $F_{thre}$ in operation 2620.

When the absolute value |F| is less than $F_{thre}$, the interference controlling apparatus may determine that the input force is not intended and thus, may not execute the content control in operation 2621.

On the contrary, when the absolute value |F| is greater than $F_{thre}$, the interference controlling apparatus may determine a direction of force and whether the force is continuously input and thereby control multimedia content.

Using the information analyzer 120, the interface controlling apparatus may generate content control information used to determine a page turning direction with respect to multimedia of content based on the force input information.

Using the content controller 130, the interface controlling apparatus may determine the page turning direction with respect to multimedia of content based on the content control information.

Using the information analyzer 120, the interface controlling apparatus may generate the content control information used to control a front page or a last page of content to be displayed based on a combination of the force input information.

Using the content controller 130, the interface controlling apparatus may control the front page or the last page of content to be displayed based on the content control information.

For example, the interface controlling apparatus may determine whether the direction of applied force is left or right in operations 2630 and 2650, and may determine whether the force input information corresponds to the continuous input in operations 2640 and 2660.

Figure 27:
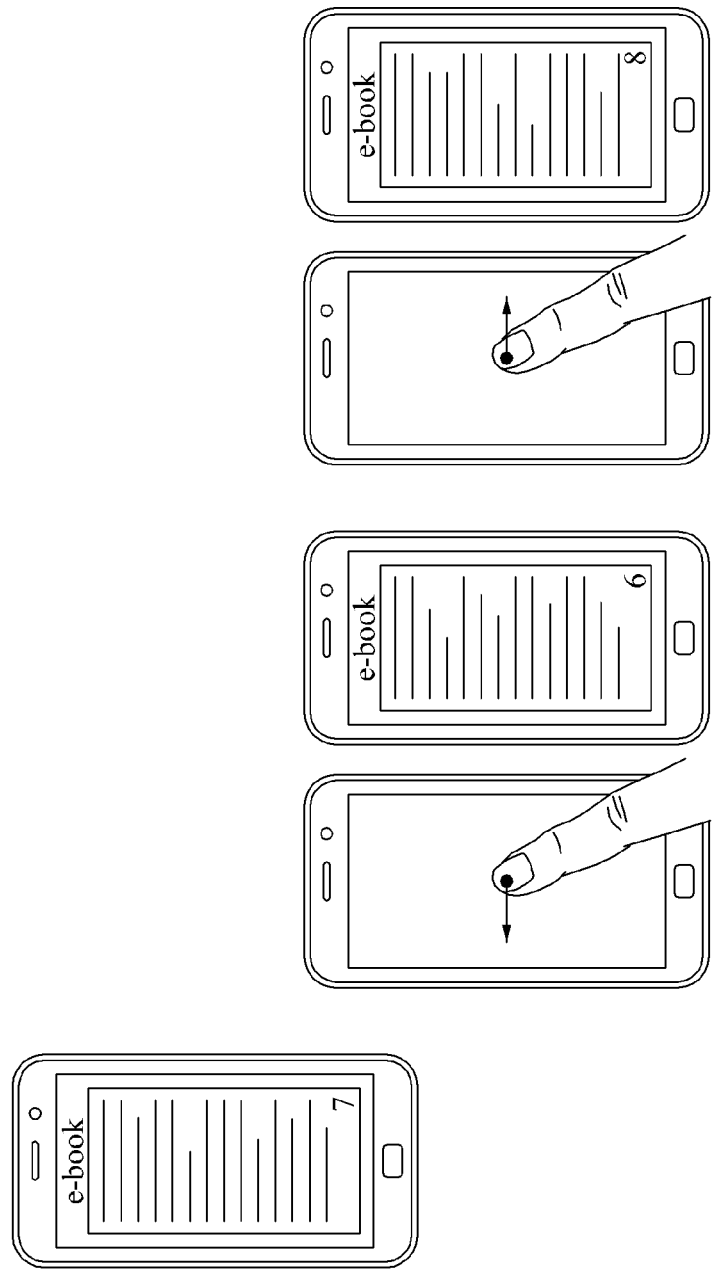
FIG. 27 and FIG. 28 illustrate examples of controlling multimedia content according to another embodiment.
Figure 28:
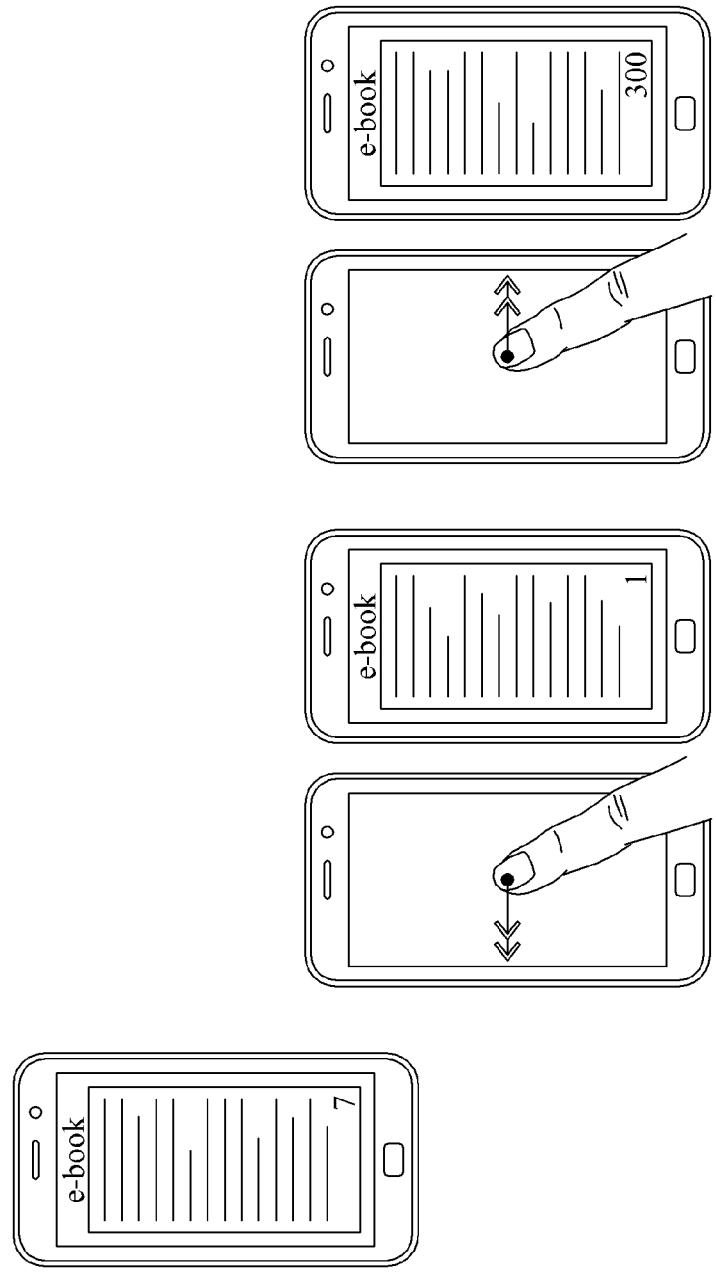

FIG. 27 and FIG. 28 illustrate examples of controlling multimedia content according to another embodiment.

Referring to FIG. 27, as an analysis result of force input information, when the direction of force is right and when the force input information corresponds to a single input, the interface controlling apparatus may control a subsequent page to be displayed in operation 2642.

As the analysis result of force input information, when the direction of force is left and when the force input information corresponds to a single input, the interface controlling apparatus may control a previous page to be displayed in operation 2662.

Referring to FIG. 28, as the analysis result of force input information, when the direction of force is right and when the force input information corresponds to the continuous input, the interface controlling apparatus may control the last page to be displayed in operation 2641.

As the analysis result of force input information, when the direction of force is left and when the force input information corresponds to the continuous input, the interface controlling apparatus may control the front page to be displayed in operation 2661.

The interface controlling apparatus may receive at least one another input information using the information receiver 110, and may generate content control information by combining the force input information and the other input information using the information analyzer 120.

The interface controlling apparatus may generate content control information by combining the force input information and various other input information such as contact input information or acceleration information, angular velocity information, or geomagnetic information, for example, that are input via other input sensors.

The interface controlling apparatus may select a target of content based on contact position information, and may control a value associated with a state of the target based on content control information that is generated by analyzing the force input information.

Figure 29:
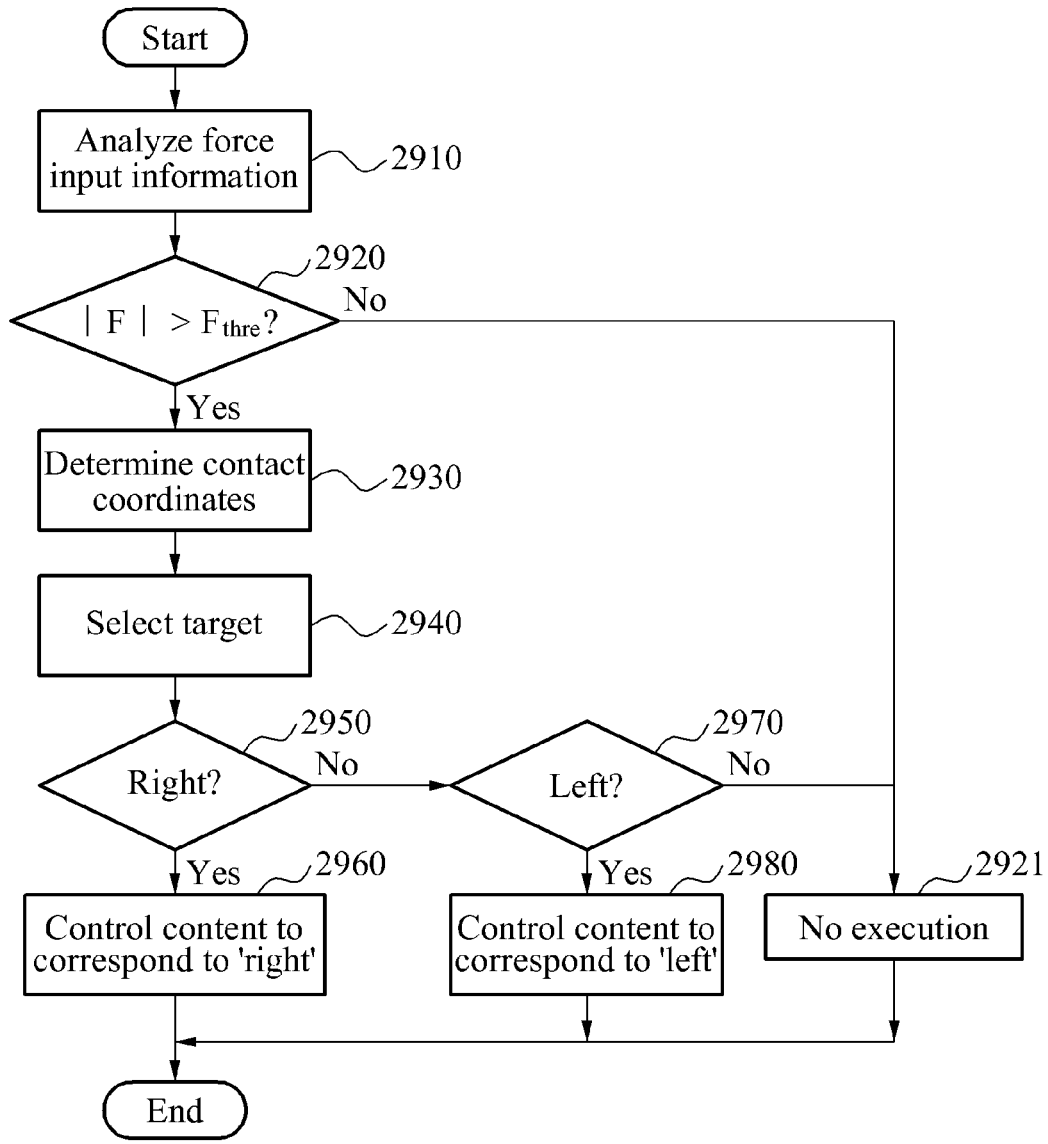
FIG. 29 illustrates a method of selecting and controlling a predetermined target according to an embodiment.
Figure 30:
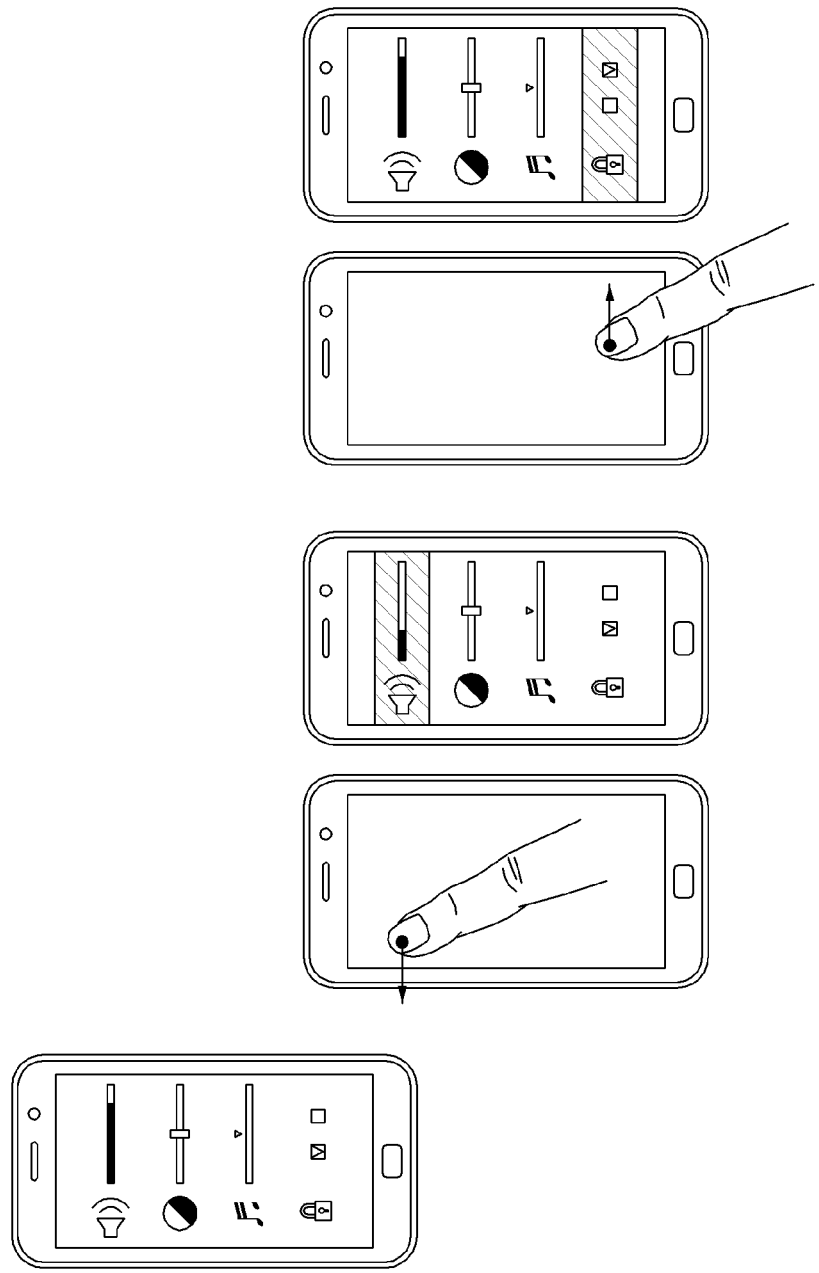
FIG. 30 illustrates an example of selecting and controlling a predetermined target according to an embodiment.

FIG. 29 illustrates a method of selecting and controlling a predetermined target according to an embodiment, and FIG. 30 illustrates an example of selecting and controlling a predetermined target according to an embodiment.

Referring to FIG. 29, the interface controlling apparatus may analyze force input information in operation 2910, and may determine whether an absolute value |F| with respect to a magnitude of force is greater than a predetermined value $F_{thre}$ in operation 2920.

When the absolute value |F| is less than $F_{thre}$, the interference controlling apparatus may determine that the input force is not intended and thus, may not execute the content control in operation 2921.

Using the information analyzer 120, the interface controlling apparatus may generate content control information by combining the force input information and contact input information.

Using the content controller 130, the interface controlling apparatus may determine a target of content based on the contact input information and may control the determined target based on the force input information.

The interface controlling apparatus may determine contact coordinates by analyzing the contact input information received from the information receiver 110 in operation 2930, and may determine a target of content corresponding to the contact coordinates in operation 2940.

In operations 2950 and 2970, the interface controlling apparatus may determine whether the direction of applied force is right or left.

Referring to FIG. 30, when the direction of force is right as the analysis result of force input information, the interface controlling apparatus may control a content control command corresponding to "right" to be executed with respect to the selected target in operation 2960.

When the direction of force is left as the analysis result of force input information, the interference controlling apparatus may control a content control command corresponding to "left" to be executed with respect to the selected target in operation 2980.

Figure 31:
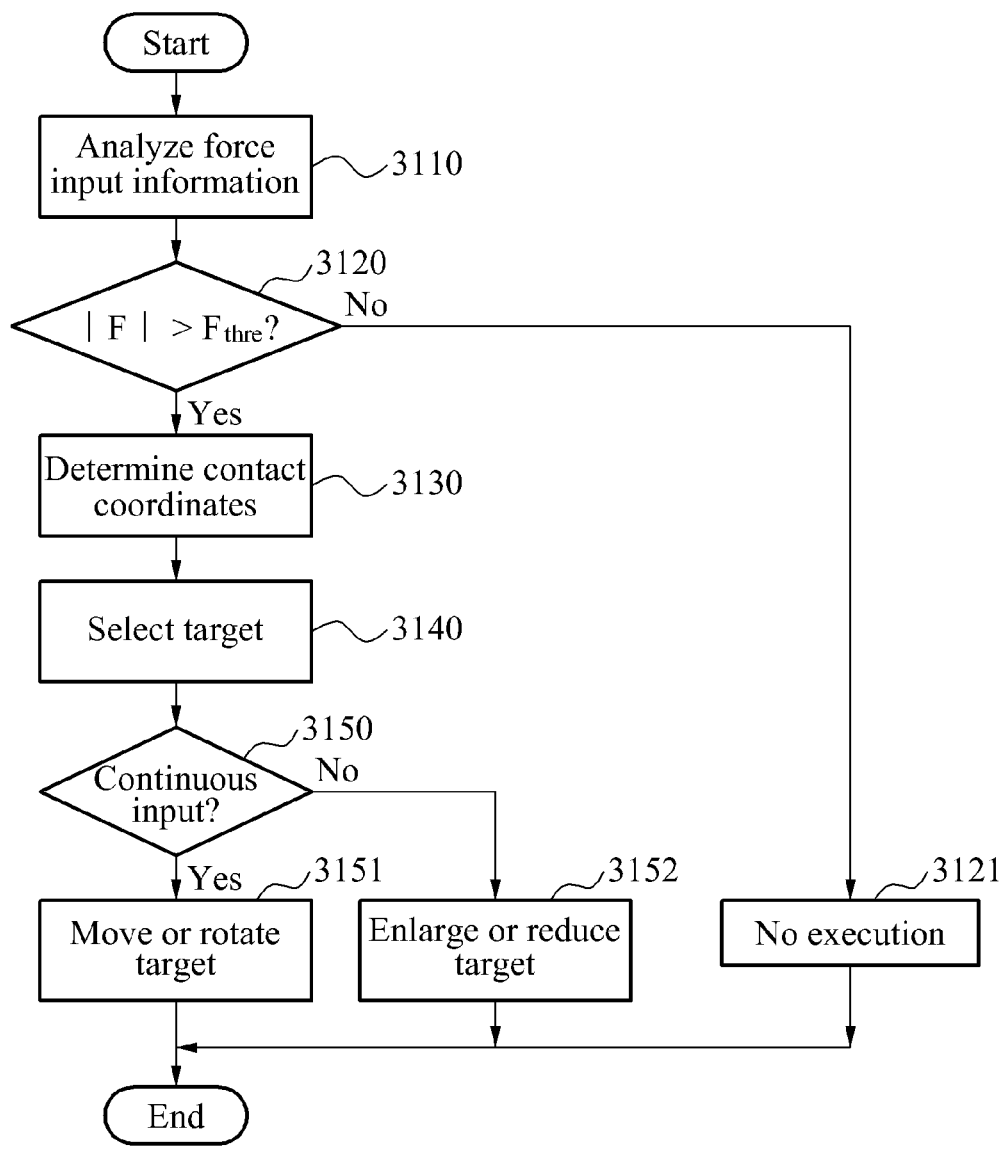
FIG. 31 illustrates a method of selecting and controlling a predetermined item according to an embodiment.
Figure 32:
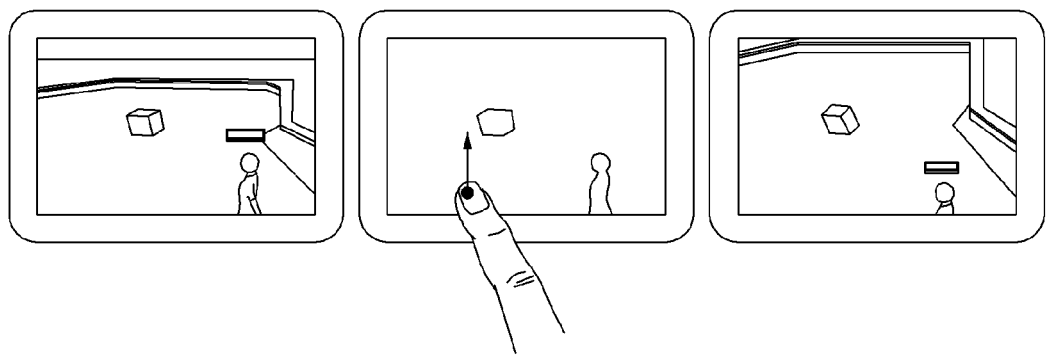
FIG. 32 and FIG. 33 illustrate examples of selecting and controlling a predetermined item according to an embodiment.
Figure 33:
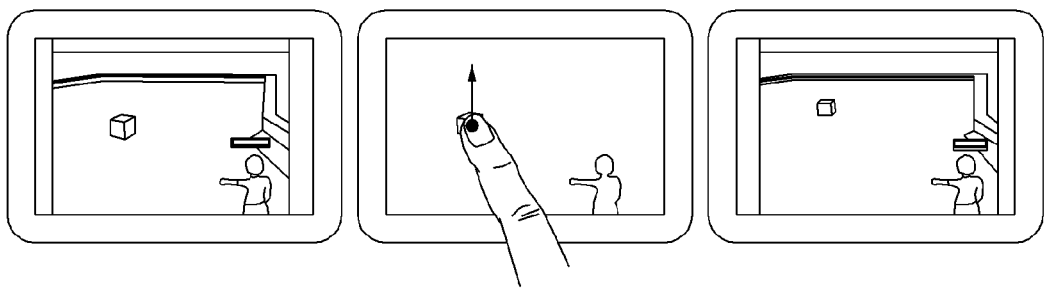

FIG. 31 illustrates a method of selecting and controlling a predetermined item according to an embodiment, and FIG. 32 and FIG. 33 illustrate examples of selecting and controlling a predetermined item according to an embodiment.

Referring to FIG. 31, the interface controlling apparatus may analyze force input information in operation 3110, and may determine whether an absolute value |F| with respect to a magnitude of force is greater than a predetermined value $F_{thre}$ in operation 3120.

When the absolute value |F| is less than $F_{thre}$, the interference controlling apparatus may determine that the input force is not intended and thus, may not execute the content control in operation 3121.

Using the information analyzer 120, the interface controlling apparatus may generate content control information by combining the force input information and acceleration information, angular velocity information, or geomagnetic information.

Using the content controller 130, the interface controlling apparatus may move a target of content based on acceleration information, angular velocity information, or geomagnetic information and may control a size of the determined target based on the force input information.

The interface controlling apparatus may determine contact coordinates by analyzing the contact input information received from the information receiver 110 in operation 3130, and may determine a target of content corresponding to the contact coordinates in operation 3140.

In operation 3150 the interface controlling apparatus may determine whether the force input information corresponds to the continuous input.

When the force input information corresponds to the continuous input as the analysis result of force input information, the interface controlling apparatus may move or rotate the selected target in operation 3151.

Referring to FIG. 32, the interface controlling apparatus may determine that a background of content is selected based on contact input information and may change a direction of a global view of content based on force input information.

Referring to FIG. 33, the interface controlling apparatus may determine that a box of content is selected based on contact input information and may change a position of the box based on force input information.

When the force input information does not correspond to the continuous input as the analysis result of force input information, the interface controlling apparatus may enlarge or reduce the selected target in operation 3152.

Figure 34:
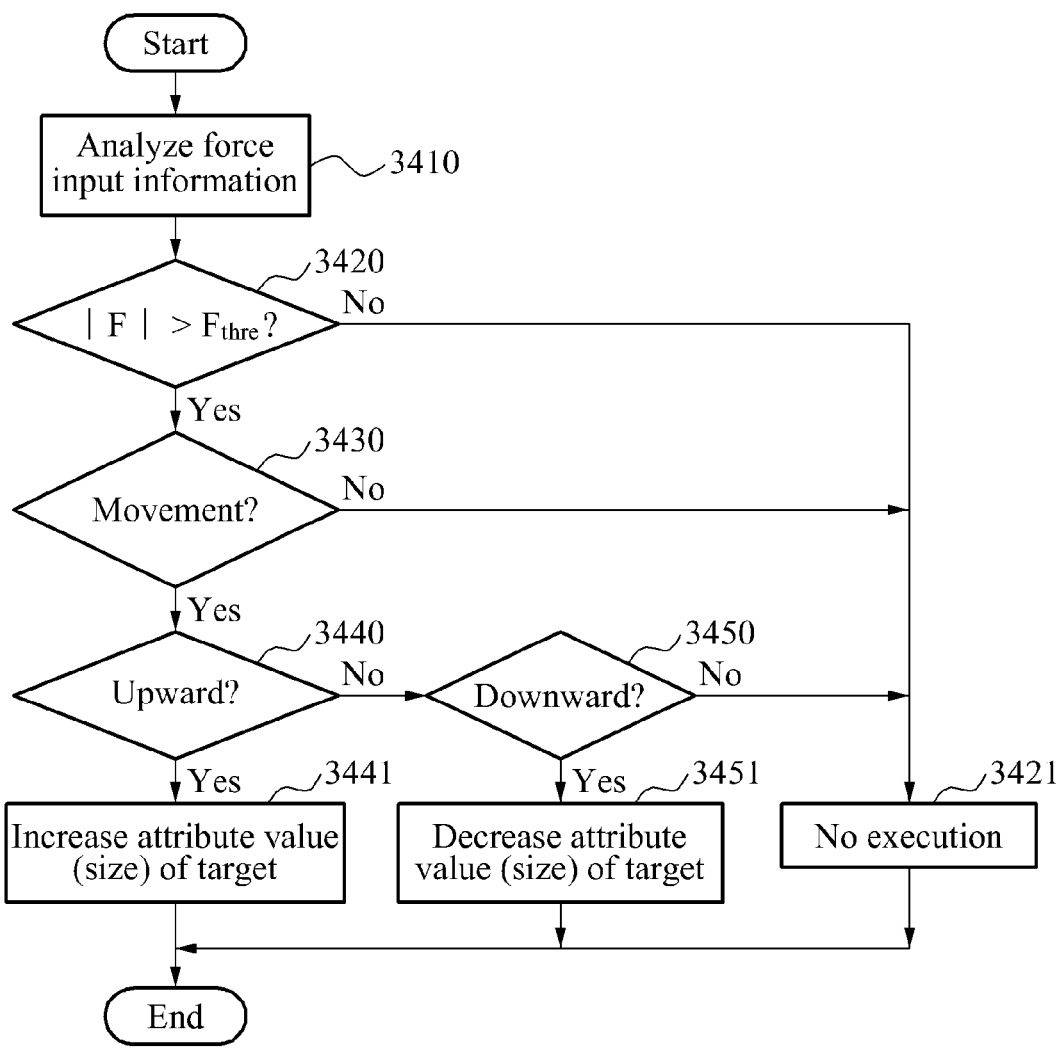
FIG. 34 illustrates a method of combining and controlling content according to an embodiment.
Figure 35:
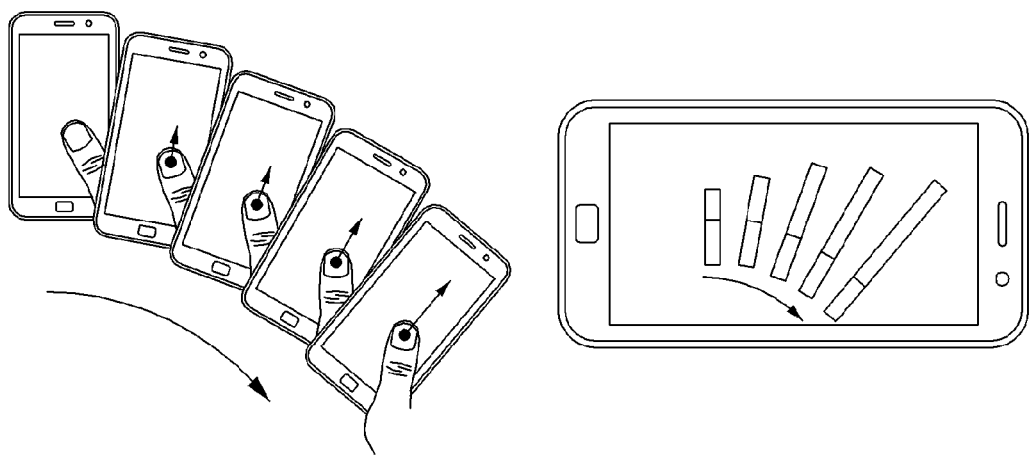
FIG. 35 illustrates an example of combining and controlling content according to an embodiment.

FIG. 34 illustrates a method of combining and controlling content according to an embodiment, and FIG. 35 illustrates an example of combining and controlling content according to an embodiment.

Referring to FIG. 34, the interface controlling apparatus may analyze force input information in operation 3410, and may determine whether an absolute value |F| with respect to a magnitude of force is greater than a predetermined value $F_{thre}$ in operation 3420.

When the absolute value |F| is less than $F_{thre}$, the interference controlling apparatus may determine that the input force is not intended and thus, may not execute the content control in operation 3421.

In operation 3430, the interface controlling apparatus may determine whether a movement of a main body is detected by analyzing other input information received from the information receiver 110. When no movement of the main body is detected, the interface controlling apparatus may not execute the content control.

In operations 3440 and 3450, the interface controlling apparatus may determine whether the direction of force is upward or downward by analyzing the force input information.

Referring to FIG. 35, as the analysis result of force input information, when the movement of the main body is detected and when the direction of force is upward, the interface controlling apparatus may increase an attribute value of a target, for example, a size of the target in operation 3441. For example, the interface controlling apparatus may tilt the target along the movement of the main body and enlarge the size of the target.

As the analysis result of force input information, when the movement of the main body is detected and when the direction of force is downward, the interface controlling apparatus may decrease an attribute value of the target, for example, a size of the target in operation 3451. For example, the interface controlling apparatus may tilt the target along the movement of the main body and reduce the size of the target.

As the analysis result of force input information, when the main body is tilted towards left and when the direction of force is downward, the interface controlling apparatus may tilt the target towards left and reduce the size of the target in operation 3451.

As the analysis result of force input information, when the main body is tilted towards left and when the direction of force is upward, the interface controlling apparatus may tilt the target towards left and enlarge the size of the target in operation 3441.

Figure 36A:
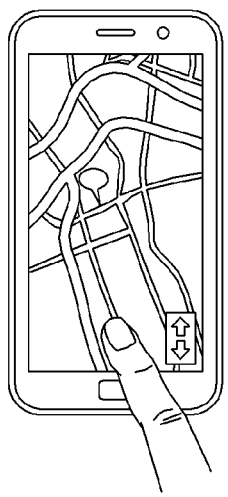
FIG. 36A and FIG. 36B illustrate a display unit of an interface controlling apparatus according to an embodiment.
Figure 36B:
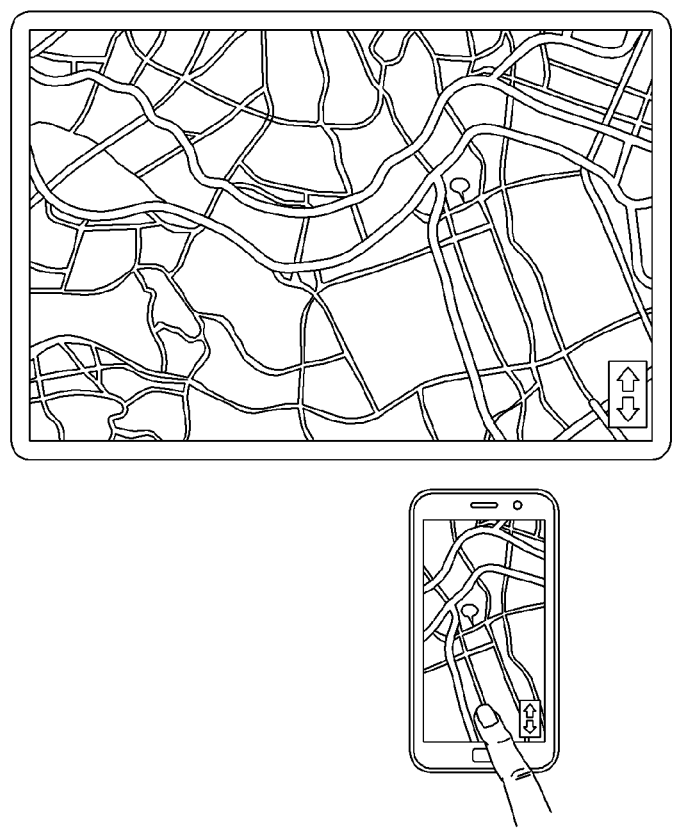

FIG. 36A and FIG. 36B illustrate a display unit of an interface controlling apparatus according to an embodiment.

The display unit of the interface controlling apparatus may be provided in a form integrated with a force input device as shown in FIG. 36A, and may also be provided in a form separable from the force input device as shown in FIG. 36B.

Figure 37:
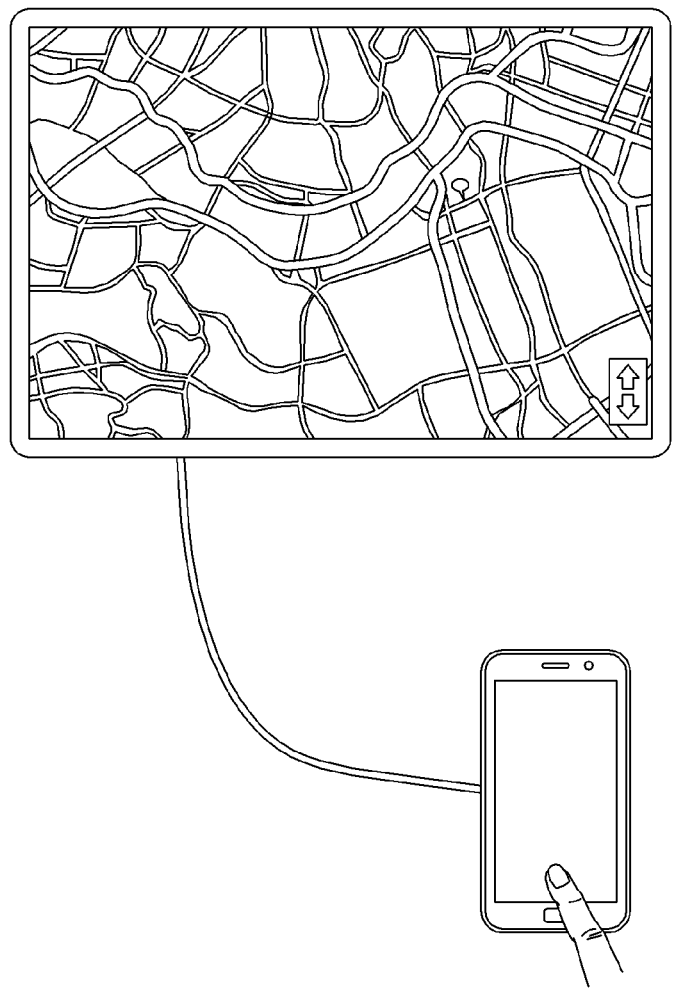
FIG. 37 and FIG. 38 illustrate a separable display unit of an interface controlling apparatus according to an embodiment.
Figure 38:
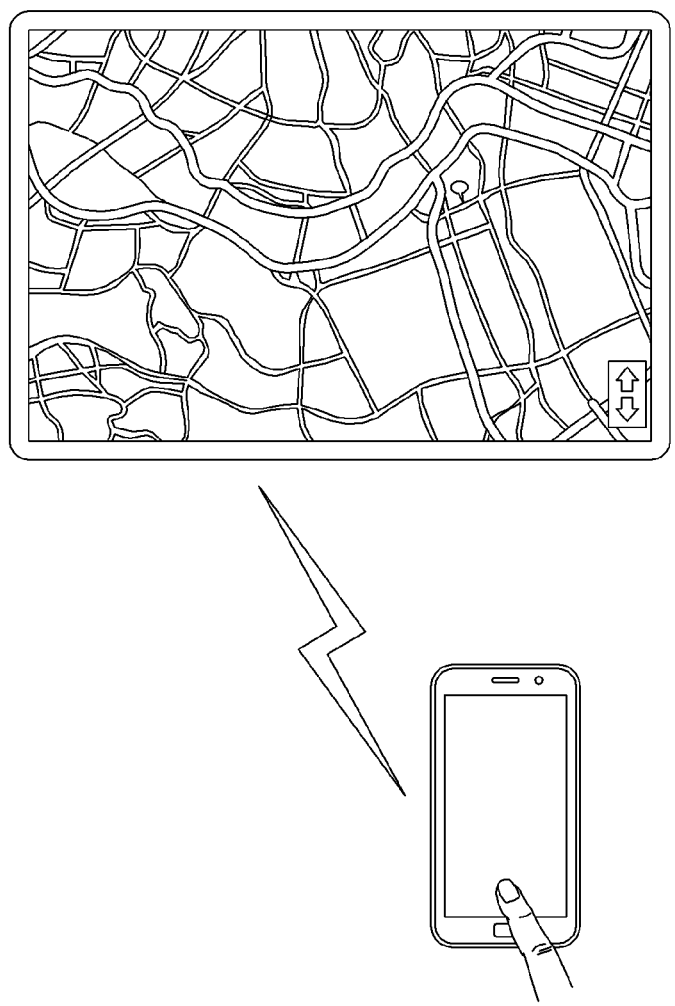

FIG. 37 and FIG. 38 illustrate a separable display unit of an interface controlling apparatus according to an embodiment.

Even though the display unit is provided in a separable form, the interface controlling apparatus may transmit and receive signals or input information in a wired or wireless manner as shown in FIG. 37 or FIG. 38.

According to embodiments, the interface controlling apparatus may remove spatial constraints in receiving an interface control signal.

According to embodiments, the interface controlling apparatus may be convenient to continuously input information and barely needs to move for the input. Therefore, it is possible to reduce movement load.

According to embodiments, the interface controlling apparatus may not expose inputting of input information to a stranger and thus, it is possible to enhance the security.

According to embodiments, the interface controlling apparatus may provide a user with tactile feedback occurring due to a reaction of force applied by the user. Therefore, the user may immediately recognize whether the input is successful.

According to embodiments, the interface controlling apparatus may accurately determine whether a user intends to input and readily recognize a start and an end of the input.

According to embodiments, it is possible to control an interface based on force input information. Therefore, it is possible to remove constraints on an input space and to enhance the convenience of continuous input.

The interface controlling method according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An interface controlling apparatus using a force, the apparatus comprising:
    an information receiver configured to receive, from at least one force sensor, force input information associated with an input force;
    an information analyzer configured to generate content control information by analyzing the force input information, including generating the content control information based on a direction of input force and a determining of which of a continuous input and a non-continuous input is represented by the input force; and
    a content controller configured to control content based on the content control information,
    wherein the force input information is based on a signal of a force sensor compressed by the input force among force sensors laterally disposed between a contact pad and a base,
    wherein an elastic substance is laterally disposed between the lateral force sensors and at least one of the contact pad or the base,
    wherein the information analyzer is configured to generate different content control information according to whether the force input information corresponds to the continuous input or the non-continuous input, whether the input force is continuously applied to different directions or same direction, and the direction of the input force,
    wherein content which is displayed on a screen is transformed differently according to whether the force input information corresponds to the continuous input or the non-continuous input, whether the input force is continuously applied to different directions or the same direction, and the direction of the input force, and
    wherein the direction of the input force and the determining of which of the continuous input and the non-continuous input is represented by the input force are based on arrangement of the at least one force sensor.

2. The apparatus of claim 1, wherein:
    the information analyzer generates the content control information used to determine a scroll direction of a visible area of the content based on the force input information and a result of the determining of which of the continuous input and the non-continuous input is represented by the force and the direction of the input force, and
    the content controller scrolls the visible area of the content based on the content control information.

3. The apparatus of claim 1, wherein:
the information analyzer generates the content control information used to control a visible area of the content to be one of enlarged and reduced based on a combination of multiple force input information and a result of the determining of which of the continuous input and the non-continuous input is represented by the input force and the direction of the input force, and
the content controller enlarges or reduces the visible area of the content based on the content control information.

4. The apparatus of claim 3, wherein the information analyzer generates the content control information used to determine between one of an enlargement rate or a reduction rate of the visible area based on a magnitude of force included in the force input information.

5. The apparatus of claim 1, wherein:
the information analyzer generates the content control information used to perform an automated change of a selection area with respect to a menu, a folder, or a file of the content based on one or more of the force input information and a result of the determining of which of the continuous input and the non-continuous input is represented by the input force and the direction of the input force, and
the content controller determines the changed selection area with respect to the menu, the folder, or the file of the content based on the content control information.

6. The apparatus of claim 1, wherein:
the information analyzer generates the content control information used to determine a selection between an upper level, a lower area, and within a current level with respect to a menu, a folder, or a file of the content based on one or more of the force input information and a result of the determining of which of the continuous input and the non-continuous input is represented by the input force and the direction of the input force, and
the content controller determines the upper area or the lower area with respect to the menu, the folder, or the file of the content based on the content control information.

7. The apparatus of claim 1, wherein:
the information analyzer generates the content control information used to determine one of a search direction and a search section with respect to multimedia of the content based on one or more of the force input information and a result of the determining of which of the continuous input and the non-continuous input is represented by the input force and the direction of the input force, and
the content controller determines the search direction or the search section with respect to the multimedia of the content based on the content control information.

8. The apparatus of claim 1, wherein:
the information analyzer generates the content control information used to determine between one of a previous file and a subsequent file with respect to multimedia of the content based on one or more of the force input information and a result of the determining of which of the continuous input and the non-continuous input is represented by the input force and the direction of the input force, and
the content controller determines the previous file or the subsequent file with respect to the multimedia of the content based on the content control information.

9. The apparatus of claim 1, wherein:
the information analyzer generates the content control information used to determine a page turning direction with respect to multimedia of the content based on the force input information and a result of the determining of which of the continuous input and the non-continuous input is represented by the input force and the direction of the input force, and
the content controller determines the page turning direction with respect to the multimedia of the content based on the content control information.

10. The apparatus of claim 1, wherein: the information analyzer generates the content control information used to control selection between one of a front page and a last page of the content to be displayed based on one or more of the force input information and a result of the determining of which of the continuous input and the non-continuous input is represented by the input force and the direction of the input force, and
the content controller controls the front page or the last page of the content to be displayed based on the content control information.

11. The apparatus of claim 1, wherein the information analyzer generates the content control information by combining the force input information and at least one other received item of input information, where the at least one other received item of input information comprises at least one of contact input information or acceleration information, angular velocity information, and geomagnetic information, wherein the acceleration information, angular velocity information, and geomagnetic information are of the interface controlling apparatus distinguished from the input force.

12. The apparatus of claim 11, wherein:
the information analyzer generates the content control information by combining the force input information and the contact input information based on a result of the determining of which of the continuous input and the non-continuous input is represented by the input force, and
the content controller determines a target of the content based on the contact input information and controls the determined target based on the force input information.

13. The apparatus of claim 11, wherein:
the information analyzer generates the content control information by combining the force input information with the acceleration information, the angular velocity information, or the geomagnetic information based on a result of the determining of which of the continuous input and the non-continuous input is represented by the input force, and
the content controller moves a target of the content based on the acceleration information, the angular velocity information, or the geomagnetic information, and changes a size of the target based on the force input information.

14. The apparatus of claim 1, wherein the force input information comprises at least one of an action point of force that is input to the at least one force sensor, a direction of force, a magnitude of force, and a time duration of force.

15. The apparatus of claim 1, wherein:
the information analyzer generates the content control information used to determine a selection between a selected playback of a previous file, a subsequent file, and a select sequential playback of a current file with respect to multimedia of the content based on one or more of the force input information and a result of the determining of which of the continuous input and the non-continuous input is represented by the input force and the direction of the input force, and the content controller determines for playback one of the previous file, the subsequent file, and the select sequential playback of the current file with respect to the multimedia of the content based on the content control information.

16. The apparatus of claim 1, wherein:
the information analyzer generates the content control information used to determine between a selected one of page turning direction and an alternate page direction to implement with respect to multimedia of the content based on the force input information and a result of the determining of which of the continuous input and the non-continuous input is represented by the input force and the direction of the input force, and
the content controller determines the page turning direction with respect to the multimedia of the content based on the content control information,
wherein the page turning direction is implemented to change pages sequentially and the alternate page direction is implemented to changes pages non-sequentially.

17. The apparatus of claim 16, wherein the implemented alternate page direction includes changing pages from a current page to any of a front page and a last page of the content.

18. The apparatus of claim 1, wherein:
the information receiver receives contact input information of a target of the content, and
the information analyzer generates the content control information by combining the force input information and the contact input information of the target so as to selectively implement one of controlled movement and rotation of the target relative to the content and controlled one of enlargement and reduction in size of the target relative to the content based on a result of the determining of which of the continuous input and the non-continuous input is represented by the input force, and
the content controller controls production of the target of the content based on the contact input information.

19. An interface controlling apparatus using a force, the apparatus comprising:
a contact pad configured to receive force input information by a user contact;
at least one force sensor configured to measure force input information about a contact area where the user contact occurs;
a base configured to support the at least one force sensor; and
a content control processor configured to generating the content control information by analyzing the force input information, including generating the content control information based on a direction of an input force and a determining of which of a continuous input and a non-continuous input is represented by the input force, and to control content based on the content control information,
wherein the force input information is based on a signal of a force sensor compressed by the input force among force sensors laterally disposed between the contact pad and the base,
wherein an elastic substance is laterally disposed between the lateral force sensors and at least one of the contact pad or the base,
wherein the content control processor is configured to generate different content control information according to whether the force input information corresponds to the continuous input or the non-continuous input, whether the input force is continuously applied to different directions or same direction, and the direction of the input force,
wherein content which is displayed on a screen is transformed differently according to whether the force input information corresponds to the continuous input or the non-continuous input, whether the input force is continuously applied to different directions or the same direction, and the direction of the input force, and
wherein the direction of the input force and the determining of which of the continuous input and the non-continuous input is represented by the input force are based on arrangement of the at least one force sensor.

20. The apparatus of claim 19, wherein the at least one force sensor comprises an elastic component.

21. The apparatus of claim 19, wherein the generating of the content control information is based on the direction of the input force and then the determining of which of the continuous input and the non-continuous input is represented by the input force.

22. An interface controlling method using a force, the method comprising:
receiving, from at least one force sensor, force input information associated with an input force;
confirming a direction of the input force;
determining which of a continuous input and a non-continuous input is represented by the input force;
generating content control information by analyzing the force input information based on the direction of the input force and a result of the determining of which of the continuous input and the non-continuous input is represented by the at least one input force; and
controlling content based on the content control information,
wherein the force input information is based on a signal of a force sensor compressed by the input force among force sensors laterally disposed between a contact pad and a base,
wherein an elastic substance is laterally disposed between the lateral force sensors and at least one of the control pad or the base,
wherein the generating of the content control information comprises generating different content control information according to whether the force input information corresponds to the continuous input or the non-continuous input, whether the input force is continuously applied to different directions or same direction, and the direction of the input force,
wherein content which is displayed on a screen is transformed differently according to whether the force input information corresponds to the continuous input or the non-continuous input, whether the input force is continuously applied to different directions or the same direction, and the direction of the input force, and
wherein the direction of the input force and the determining of which of the continuous input and the non-continuous input is represented by the input force are based on arrangement of the at least one force sensor.

23. A non-transitory computer-readable recording medium storing a program to implement the method of claim 22.

24. The method of claim 22, further comprising:
providing tactile feedback based on the force input information and the result of the determining of which of the continuous input and the non-continuous input is represented by the input force and the direction of the input force.

25. The apparatus of claim 22, wherein the generating of the content control information is based on the direction of the input force and then the determining of which of the continuous input and the non-continuous input is represented by the input force.

26. An interface controlling apparatus using a force, the apparatus comprising:
- an information receiver configured to receive, from at least one force sensor, force input information associated with an input force;
- an information analyzer configured to generate content control information by analyzing the force input information; and
- a content controller configured to control content based on the content control information, wherein:
- the information analyzer is configured to selectively perform one of generating the content control information so as to determine between one of a zoom in and zoom out operation is to be performed on a visible area of the content and generating the content control information so as to determine which direction to perform a scroll operation of the visible area of the content, based on a result of a determining of which of a continuous input and a non-continuous input is represented by input force; and
- the content controller is configured to selectively perform one the zoom in or zoom out operation and the scroll operation based on the content control information,
- wherein the force input information is based on a signal of a force sensor compressed by the input force among force sensors laterally disposed between a contact pad and a base,
- wherein an elastic substance is laterally disposed between the lateral force sensors and at least one of the contact pad or the base,
- wherein the information analyzer is configured to generate different content control information according to whether the force input information corresponds to the continuous input or the non-continuous input, whether the input force is continuously applied to different directions or same direction, and a direction of the input force,
- wherein content which is displayed on a screen is transformed differently according to whether the force input information corresponds to the continuous input or the non-continuous input, whether the input force is continuously applied to different directions or the same direction, and the direction of the input force, and
- wherein the direction of the input force and the determining of which of the continuous input and the non-continuous input is represented by the input force are based on arrangement of the at least one force sensor.

27. An interface controlling apparatus using a force, the apparatus comprising:
- an information receiver configured to receive, from at least one force sensor, force input information associated with an input force;
- an information analyzer configured to generate content control information by analyzing the force input information; and
- a content controller configured to control content based on the content control information, wherein:
- the information analyzer is configured to generate the content control information used to perform an automated change of a selection area with respect to a menu, a folder, or a file of the content from a current selection area to an adjacent selection area with respect to the menu, folder, or file, based on the force input information representing a magnitude of force corresponding to the input force, a direction of the input force, and a determining of which of a continuous input and a non-continuous input is represented by the input force; and
- the content controller is configured to determine the changed selection area with respect to the menu, the folder, or the file of the content based on the content control information,
- wherein the force input information is based on a signal of a force sensor compressed by the input force among force sensors laterally disposed between a contact pad and a base,
- wherein an elastic substance is laterally disposed between the lateral force sensors and at least one of the contact pad or the base,
- wherein the information analyzer is configured to generate different content control information according to whether the force input information corresponds to the continuous input or the non-continuous input, whether the input force is continuously applied to different directions or same direction, and the direction of the input force,
- wherein content which is displayed on a screen is transformed differently according to whether the force input information corresponds to the continuous input or the non-continuous input, whether the input force is continuously applied to different directions or the same direction, and the direction of the input force, and
- wherein the direction of the input force and the determining of which of the continuous input and the non-continuous input is represented by the input force are based on arrangement of the at least one force sensor.

* * * * *